United States Patent
Kurokawa

(10) Patent No.: US 9,562,797 B2
(45) Date of Patent: Feb. 7, 2017

(54) FLOW RATE MEASURING APPARATUS

(75) Inventor: Toshikuni Kurokawa, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 719 days.

(21) Appl. No.: 14/004,692

(22) PCT Filed: Mar. 15, 2011

(86) PCT No.: PCT/JP2011/056104
§ 371 (c)(1),
(2), (4) Date: Sep. 12, 2013

(87) PCT Pub. No.: WO2012/124062
PCT Pub. Date: Sep. 20, 2012

(65) Prior Publication Data
US 2014/0002640 A1    Jan. 2, 2014

(51) Int. Cl.
G01F 1/66 (2006.01)
G01F 1/86 (2006.01)
(Continued)

(52) U.S. Cl.
CPC .............. *G01F 1/661* (2013.01); *G01F 1/7086* (2013.01); *G01F 1/86* (2013.01); *G01P 5/26* (2013.01)

(58) Field of Classification Search
CPC .......... G01F 1/661; G01F 1/7086; G01F 1/86; G01P 5/26
(Continued)

(56) References Cited

U.S. PATENT DOCUMENTS 6,013,921 A * 1/2000 Moller ................... G01F 1/704
250/356.1

FOREIGN PATENT DOCUMENTS

JP    91-157978    7/1986
JP    2004-333276    11/2004
(Continued)

OTHER PUBLICATIONS

Van Doorne C W H et al: "Measurement of laminar, transitional and turbulent pipe flow using Stereoscopic-PIV", Experiments in Fluids; Experimental Methods and Their Applications to Fluid Flow, Springer, Berlin, DE, vol. 42, No. 2, Dec. 8, 2006, pp. 259-279, XP019473415, ISSN: 1432-1114.
(Continued)

*Primary Examiner* — Siamak Harandi
*Assistant Examiner* — Amandeep Saini
(74) *Attorney, Agent, or Firm* — Finnegan, Henderson, Farabow, Garrett & Dunner, LLP

(57) ABSTRACT

A flow rate measuring apparatus capable of accurately measuring a mass flow rate of an exhaust gas, includes a laser distributor causing a sheet-like laser to move in a laser introduction duct. An imaging device takes images at specified times. A processor calculates, based on the images, motion vectors of an exhaust gas for a period at a plurality of positions in each image; averages the motion vectors into one motion vector; and calculates the Y-components of the averaged motion vectors in the images as movement amounts of the exhaust gas, an arithmetic mean of the movement amounts as a representative movement amount of the exhaust gas, an actual flow velocity of the exhaust gas from the representative movement amount, an actual flow rate of the exhaust gas from the actual flow velocity, and, based on the actual flow rate, a mass flow rate of the exhaust gas.

6 Claims, 14 Drawing Sheets

(51) Int. Cl.
*G01F 1/708* (2006.01)
*G01P 5/26* (2006.01)

(58) Field of Classification Search
USPC .......................................................... 382/100
See application file for complete search history.

(56) References Cited

FOREIGN PATENT DOCUMENTS

| | | |
|---|---|---|
| JP | 2005-121439 | 5/2005 |
| JP | 2008-215999 | 9/2008 |
| JP | 2009-264772 | 11/2009 |

OTHER PUBLICATIONS

Hori T et al: "High-speed scanning stereoscopic PIV for 3D vorticity measurement in liquids", Measurement Science and Technology, IOP, Bristol, GB, vol. 15, No. 6, Jun. 1, 2004, pp. 1067-1078, XP001210152, ISSN: 0957-0233, DOI: 10.1088/0957-0233/15/6/005.

Stephan Kallweit, Chris Willert, Michael Dues, Ulrich Müller: "PIV for Volume Flow Metering", 14$^{th}$ International Symposium on Applications of Laser Techniques to Fluid Mechanics, Jul. 10, 2008, XP002728098, Retrieved from the Internet: URL:http://ltces.dem.ist.utl.pt/lxlaser/lxlaser2008/papers/P2_3.pdf [Retrieved on Aug. 1, 2014].

\* cited by examiner (a)

| | Diameter [μm] | Density [kg/m³] | Particle time constant [s] |
|---|---|---|---|
| Tracer | 10 | 40 | $0.113 \times 10^{-4}$ |
| Engine oil | 20 | 700 | $7.78 \times 10^{-4}$ |
| Fuel | 20 | 700 | $7.78 \times 10^{-4}$ |
| Water | 20 | 1000 | $11.1 \times 10^{-4}$ |

| | Viscosity [μPa·s] | Density [kg/m³] |
|---|---|---|
| Exhaust gas | 20 | 1.2 |

FLOW RATE MEASURING APPARATUS

CROSS-REFERENCE TO RELATED APPLICATIONS

This application is a national phase application of International Application No. PCT/JP2011/056104, filed Mar. 15, 2011, the content of which is incorporated herein by reference.

TECHNICAL FIELD

The present invention relates to a flow rate measuring apparatus for measuring a flow rate of fluid, especially to a technique for measuring a mass flow rate of an exhaust gas from an engine of a car and the like by image processing.

BACKGROUND ART

Conventionally, as a flow rate measuring apparatus for measuring a mass flow rate of a gas, widely known is a differential pressure type of flowmeter having a pitot tube, an orifice plate or the like, an ultrasonic type of flowmeter having an ultrasonic sensor, a laminar flow type of flowmeter having laminar flow elements with a plurality of tubes, a hot wire type of flowmeter having a heater (hot wire), and the like.

However, in the case of measuring a mass flow rate of an exhaust gas from an engine of a car and the like, the flow rate measuring apparatus mentioned above should not be used.

This is because the exhaust gas has properties that (1) matters (e.g. water drops into which vapor condenses, unburned fuel, and engine oil) other than a gas component are present therein, (2) a flow velocity thereof widely varies depending on a temperature, a rotational speed of the engine, and the like, (3) pressure pulsation proportional to the rotational speed and the number of cylinders of the engine occurs, and (4) a flow thereof becomes imbalanced because of a bending portion of an exhaust duct, and these properties of the exhaust gas shown at (1) to (4) disable the flow rate measuring apparatus mentioned above from accurately measuring the mass flow rate of the exhaust gas.

Patent Literature 1 discloses an apparatus which performs PIV (Particle Image Velocimetry) processing to analyze fluid flowing through a duct.

The apparatus disclosed in Patent Literature 1, at each of two points in time apart from each other at a minute time interval, irradiates the inside of the duct through which the fluid flows with a sheet-like laser, and at the same time, takes an image of a section of the internal space of the duct cut by the sheet-like laser. Then, the apparatus calculates movement amounts of particles of the fluid on the basis of the images taken at the two points in time. By using the movement amounts of particles of the fluid calculated in this manner, a mass flow rate of the fluid flowing through the duct can be calculated.

Though the apparatus disclosed in Patent Literature 1 can take an image of any place in the duct, in the case of measuring the mass flow rate of an exhaust gas, the apparatus cannot accurately measure the mass flow rate of the exhaust gas because of no consideration of imbalance of fluid flow.

CITATION LIST

Patent Literature

Patent Literature 1: JP 2008-215999 A

SUMMARY OF INVENTION

Problem to Be Solved By the Invention

The objective of the present invention is to provide a flow rate measuring apparatus capable of accurately measuring a mass flow rate of an exhaust gas.

Means for Solving the Problem

A first aspect of the invention is a flow rate measuring apparatus for measuring a mass flow rate of an exhaust gas from an engine, which includes a duct through which the exhaust gas and tracers flow, a laser oscillator which applies a laser, a laser distributor which reflects the laser applied by the laser oscillator to turn the laser into a sheet-like laser such as cuts the internal space of the duct along a flow direction of the exhaust gas, and which moves the sheet-like laser in a direction perpendicular to the flow direction of the exhaust gas, an imaging device which takes an image of a section of the internal space of the duct cut by the sheet-like laser formed by the laser distributor, and a processor which calculates the mass flow rate of the exhaust gas. The laser distributor causes the sheet-like laser to make one round trip over the whole area in the duct in the direction where the sheet-like laser moves. The imaging device defines a time required for the sheet-like laser to make the one round trip in the duct as one period, and takes a plurality of images for the one period at regular time intervals at an exposure time shorter than one of a plurality of equal parts into which the one period is divided while synchronizing a timing of taking the images with one of the plurality of equal parts into which the one period is divided. The processor obtains a plurality of images of continuous two periods from the imaging device, calculates, based on the plurality of images of the continuous two periods, motion vectors of the exhaust gas for the one period at a plurality of positions in each of the plurality of images of the one period, averages the motion vectors of the exhaust gas at the plurality of positions in each of the plurality of images of the one period into one motion vector, calculates a component, in the flow direction of the exhaust gas, of the one motion vector in each of the plurality of images of the one period as a movement amount of the exhaust gas, calculates an arithmetic mean of the movement amounts of the exhaust gas in the plurality of images of the one period as a representative movement amount of the exhaust gas, calculates an actual flow velocity of the exhaust gas from the representative movement amount of the exhaust gas, calculates an actual flow rate of the exhaust gas from the actual flow velocity of the exhaust gas, and calculates, based on the actual flow rate of the exhaust gas, the mass flow rate of the exhaust gas.

Preferably, the exposure time at which the imaging device takes each image is a half of one of the plurality of equal parts into which the one period is divided.

Preferably, the processor removes erroneous vectors from the motion vectors of the exhaust gas at the plurality of positions in each image which are calculated on the basis of two images taken at a time interval of the one period, using the motion vectors of the exhaust gas at the plurality of positions in each image which are calculated on the basis of two images taken at a time interval shorter than the one period.

Preferably, the processor extracts contours of shading of the exhaust gas in each of the plurality of images of the continuous two periods, and calculates, based on each of the plurality of images of the continuous two periods in which the contours of shading of the exhaust gas are extracted, the motion vectors of the exhaust gas at the plurality of positions in each of the plurality of images of the one period.

Preferably, the flow rate measuring apparatus further includes an absolute manometer which measures an absolute pressure of the exhaust gas flowing through the duct, a bypass which has both ends attached to the duct, and which communicates with the duct, and a manometer which measures a pressure of the exhaust gas flowing through the bypass. The processor calculates, based on the pressure of the exhaust gas flowing through the bypass measured by the manometer, a primary natural frequency of an air column in the bypass, calculates a sonic velocity in the bypass from the primary natural frequency of the air column in the bypass, calculates a sonic velocity under an atmosphere of the exhaust gas from the sonic velocity in the bypass, calculates, based on the sonic velocity under the atmosphere of the exhaust gas, an instantaneous temperature of the exhaust gas, calculates a volumetric flow rate of the exhaust gas in a standard condition from the instantaneous temperature, the absolute pressure and the actual flow rate of the exhaust gas, and calculates, based on the volumetric flow rate of the exhaust gas in the standard condition, the mass flow rate of the exhaust gas.

Preferably, the flow rate measuring apparatus further includes an air-fuel ratio meter which measures an air-fuel ratio of the exhaust gas flowing through the duct. The processor calculates, based on the air-fuel ratio of the exhaust gas, and properties of fuel as a source of the exhaust gas, an average molecular mass of the exhaust gas, calculates a density of the exhaust gas from the average molecular mass of the exhaust gas, and calculates, based on the density of the exhaust gas, the mass flow rate of the exhaust gas.

Effects of the Invention

The present invention makes it possible to accurately measure a mass flow rate of an exhaust gas.

BRIEF DESCRIPTION OF DRAWINGS

FIG. 7 shows how PIV processing is performed, in which FIG. 7(a) illustrates an image taken at a first point in time, FIG. 7(b) illustrates an image taken at a second point in time, and FIG. 7(c) illustrates motion vectors of fluid from the first point to the second point in time.

FIG. 8 shows how a contour image is generated, in which FIG. 8(a) illustrates a grayscale image, and FIG. 8(b) illustrates the contour image.

FIG. 10 shows a difference in particle time constant between a tracer and disturbance matters.

FIG. 12 shows a difference in distribution of movement amount between the tracer and the disturbance matter, in which FIG. 12(a) illustrates distribution of movement amount for one period of the tracer and the disturbance matter, and FIG. 12(b) illustrates distribution of movement amount for a time shorter than one period of the tracer and the disturbance matter.

DESCRIPTION OF EMBODIMENTS

With reference to FIGS. 1 to 5, described below is a flow rate measuring apparatus 1 as an embodiment of a flow rate measuring apparatus according to the present invention.

The flow rate measuring apparatus 1 measures a flow rate (specifically, a mass flow rate M [kg/s]) of an exhaust gas from an engine of a car and the like.

Figure 1:
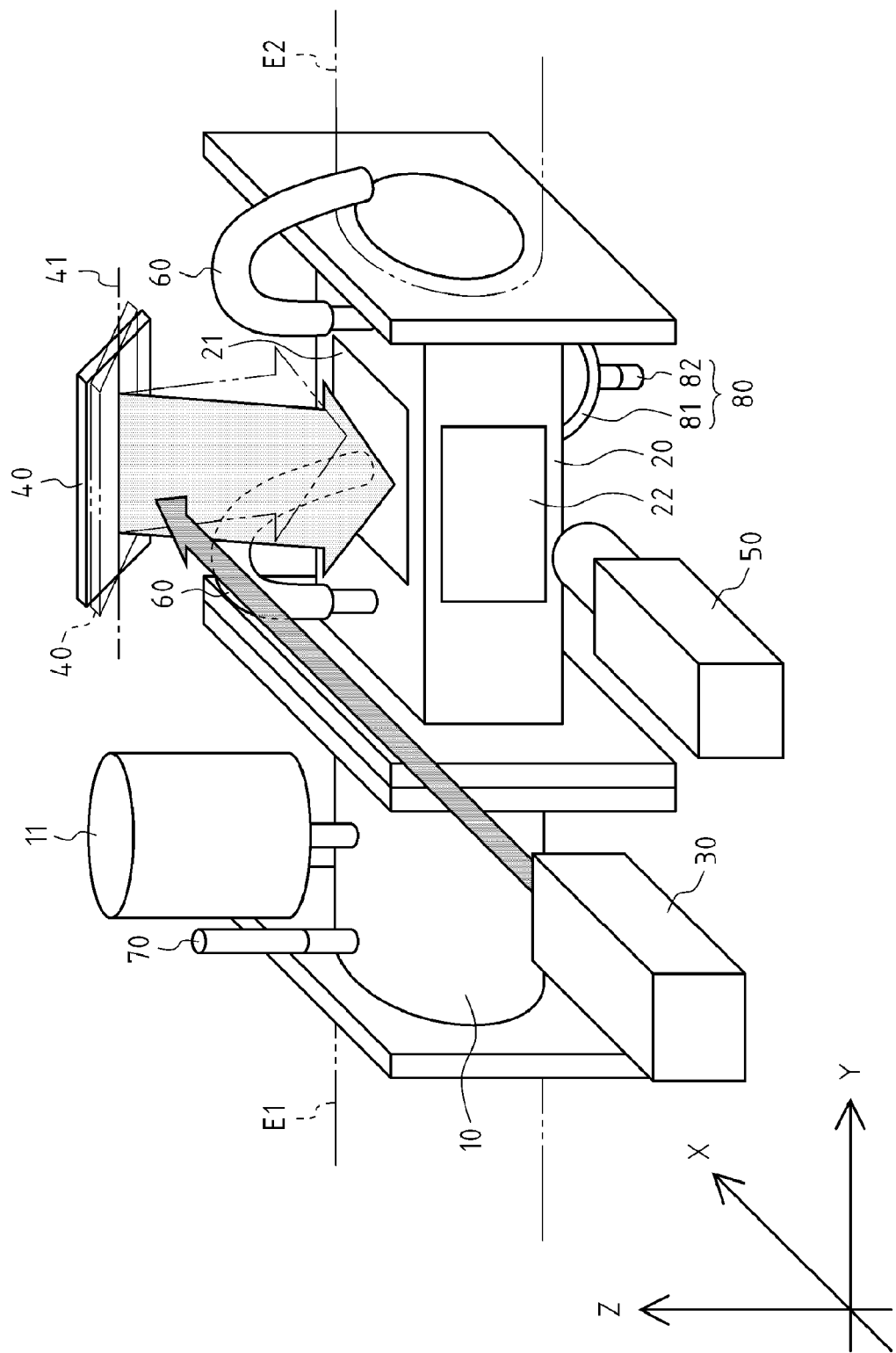
FIG. 1 illustrates a flow rate measuring apparatus according to an embodiment of the present invention.

Note that a direction indicated by an arrow Y in FIG. 1 is a flow direction of the exhaust gas. Hereinafter, an upstream side in the flow direction of the exhaust gas is referred to as simply "an upstream side", and a downstream side in the flow direction of the exhaust gas is referred to as simply "a downstream side".

Moreover, a direction indicated by an arrow X in FIG. 1 is defined as a rear direction of the flow rate measuring apparatus 1 to define a front-rear direction thereof, and a direction indicated by an arrow Z in FIG. 1 is defined as a top direction of the flow rate measuring apparatus 1 to define a top-bottom direction thereof.

Figure 2:
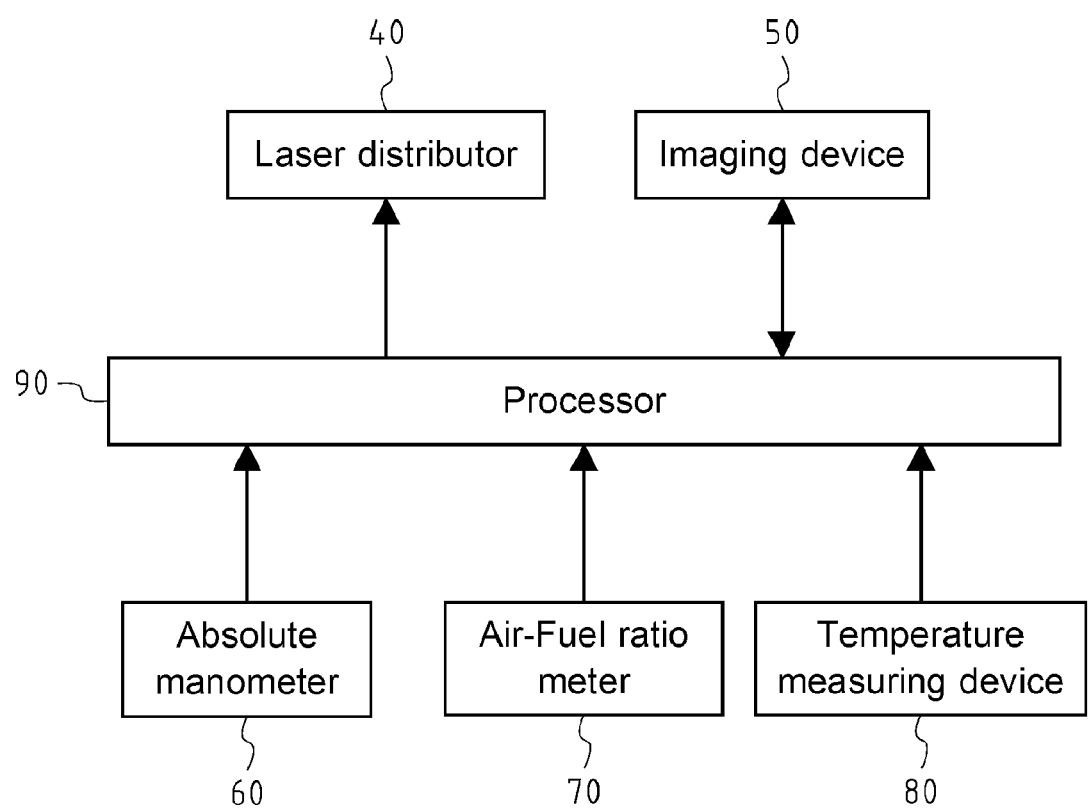
FIG. 2 is a block diagram showing a relationship between a laser distributor, an imaging device, an absolute manometer, an air-fuel ratio meter, a temperature measuring device and a processor.

As shown in FIG. 1, the flow rate measuring apparatus 1 includes a tracer introduction duct 10, a laser introduction duct 20, a laser oscillator 30, a laser distributor 40, an imaging device 50, two absolute manometers 60, an air-fuel ratio meter 70, a temperature measuring device 80, and a processor 90 (see FIG. 2).

The tracer introduction duct 10 is formed in substantially a hollow cylinder, and is arranged on a flow path of the exhaust gas so that the exhaust gas flows therethrough. Specifically, the end on the upstream side of the tracer introduction duct 10 is connected to an exhaust duct E1 of the car and the like. Tracers stored in a tracer distributor 11 are introduced into the tracer introduction duct 10, and flow through the tracer introduction duct 10 with the exhaust gas.

The tracers are particle matters used for visualizing the exhaust gas. Normally, the exhaust gas cannot directly be imaged. However, if the exhaust gas including the tracers is irradiated with a laser and the like, Mie scattering occurs by the tracers and scattered light is generated. Therefore, by mixing the tracers in the exhaust gas, the exhaust gas is visualized by the tracers, and consequently the exhaust gas can be imaged.

The tracer distributor 11 contains a predetermined amount of tracers, and supplies the inside of the tracer introduction duct 10 with the tracers.

The end on the downstream side of the tracer introduction duct 10 is connected to the laser introduction duct 20. In other words, the tracer introduction duct 10 is arranged on the upstream side, and the laser introduction duct 20 is arranged on the downstream side.

The laser introduction duct 20 is a duct whose outer shape is formed in substantially a rectangular cuboid, and whose inner shape is formed to be flush with the inner circumferential surface of the tracer introduction duct 10. The laser introduction duct 20 is, as well as the tracer introduction duct 10, arranged on the flow path of the exhaust gas so that the exhaust gas flows therethrough. Specifically, the end on the downstream side of the laser introduction duct 20 is connected to an exhaust duct E2 of the car and the like.

Thus, the exhaust gas introduced from the exhaust duct E1 to the tracer introduction duct 10 is mixed with the tracers in the tracer introduction duct 10, and then flows into the exhaust duct E2 through the laser introduction duct 20.

The laser oscillator 30 irradiates the laser distributor 40 with a laser beam.

The laser distributor 40 reflects the laser beam from the laser oscillator 30, and turns the laser beam into a sheet-like laser to cut the internal space of the laser introduction duct 20 along the flow direction of the exhaust gas. For example, a MEMS (Micro Electro Mechanical Systems) minor is applied to the laser distributor 40. The laser distributor 40 is turnably provided on a shaft 41 extending parallel to the flow direction of the exhaust gas, and is arranged above the laser introduction duct 20. The laser distributor 40 introduces the sheet-like laser into the laser introduction duct 20 at an angle according to the turning angle through a laser introduction window 21 formed on the top face of the laser introduction duct 20.

The laser introduction window 21 is made of a permeable material through which the sheet-like laser formed by the laser distributor 40 is introduced into the laser introduction duct 20, and is formed on the top face of the laser introduction duct 20 from the outer surface to the inner circumferential surface of the laser introduction duct 20.

The imaging device 50 takes an image of a section of the internal space of the laser introduction duct 20 cut by the sheet-like laser through an imaging window 22 formed on the front face of the laser introduction duct 20. The imaging device 50 is arranged frontward of the imaging window 22 so that an imaging direction thereof is perpendicular to the flow direction of the exhaust gas. Therefore, an image taken by the imaging device 50 corresponds to an image on Y-Z plane (a plane defined by the flow direction of the exhaust gas and the top-bottom direction).

The imaging window 22 is made of a permeable material enabling the imaging device 50 to image the inside of the laser introduction duct 20 from the outside of the laser introduction duct 20. The imaging window 22 is formed on the front face of the laser introduction duct 20 from the outer surface to the inner circumferential surface of the laser introduction duct 20.

The absolute manometers 60 measure an absolute pressure $Pm$ [kPa (abs)] of the exhaust gas in the flow rate measuring apparatus 1. The absolute manometers 60 are provided on the top face of the laser introduction duct 20, and are arranged on the upstream side and the downstream side of the laser introduction duct 20 across the laser introduction window 21. The average of absolute pressures of the exhaust gas measured by the absolute manometers 60 at two different positions (the upstream side and the downstream side of the laser introduction duct 20) is assumed to be the absolute pressure $Pm$ [kPa (abs)] of a part of the exhaust gas irradiated with the sheet-like laser. This is because, though it is normally desirable to directly measure the absolute pressure $Pm$ [kPa (abs)] of the part of the exhaust gas irradiated with the sheet-like laser, it is difficult to arrange the absolute manometer 60 to measure the absolute pressure of the part because of imaging of the exhaust gas by the imaging device 50. Note that the absolute pressure of the exhaust gas measured by one absolute manometer 60 may be assumed to be the absolute pressure $Pm$ [kPa (abs)] of the part of the exhaust gas irradiated with the sheet-like laser.

The air-fuel ratio meter 70 measures an air-fuel ratio $Rm$ of the exhaust gas in the flow rate measuring apparatus 1, and is arranged on the upper part of the tracer introduction duct 10.

The temperature measuring device 80 measures an instantaneous temperature $Tm$ [° C.] of the exhaust gas in the flow rate measuring apparatus 1, and has a bypass 81 and a manometer 82. Note that the instantaneous temperature $Tm$ [° C.] is not directly measured by the temperature measuring device 80, and is calculated from a pressure of the exhaust gas flowing through the bypass 81 which is measured by the manometer 82, the air-fuel ratio $Rm$ and the like. Details of a method for calculating the instantaneous temperature $Tm$ [° C.] of the exhaust gas are mentioned later.

The bypass 81 is a tube communicating with the inside of the laser introduction duct 20, and is arranged downstream of the imaging window 22. Both the ends of the bypass 81 are apart from each other along the flow direction of the exhaust gas, and are attached to the bottom face of the laser introduction duct 20 so that the inside of the bypass 81 communicates with the inside of the laser introduction duct 20.

The manometer 82 measures the pressure of the exhaust gas flowing through the bypass 81, and is attached to the bypass 81.

As shown in FIG. 2, the processor 90 is electrically connected with the laser distributor 40 and the imaging device 50, and controls the laser distributor 40 and the imaging device 50.

Figure 3:
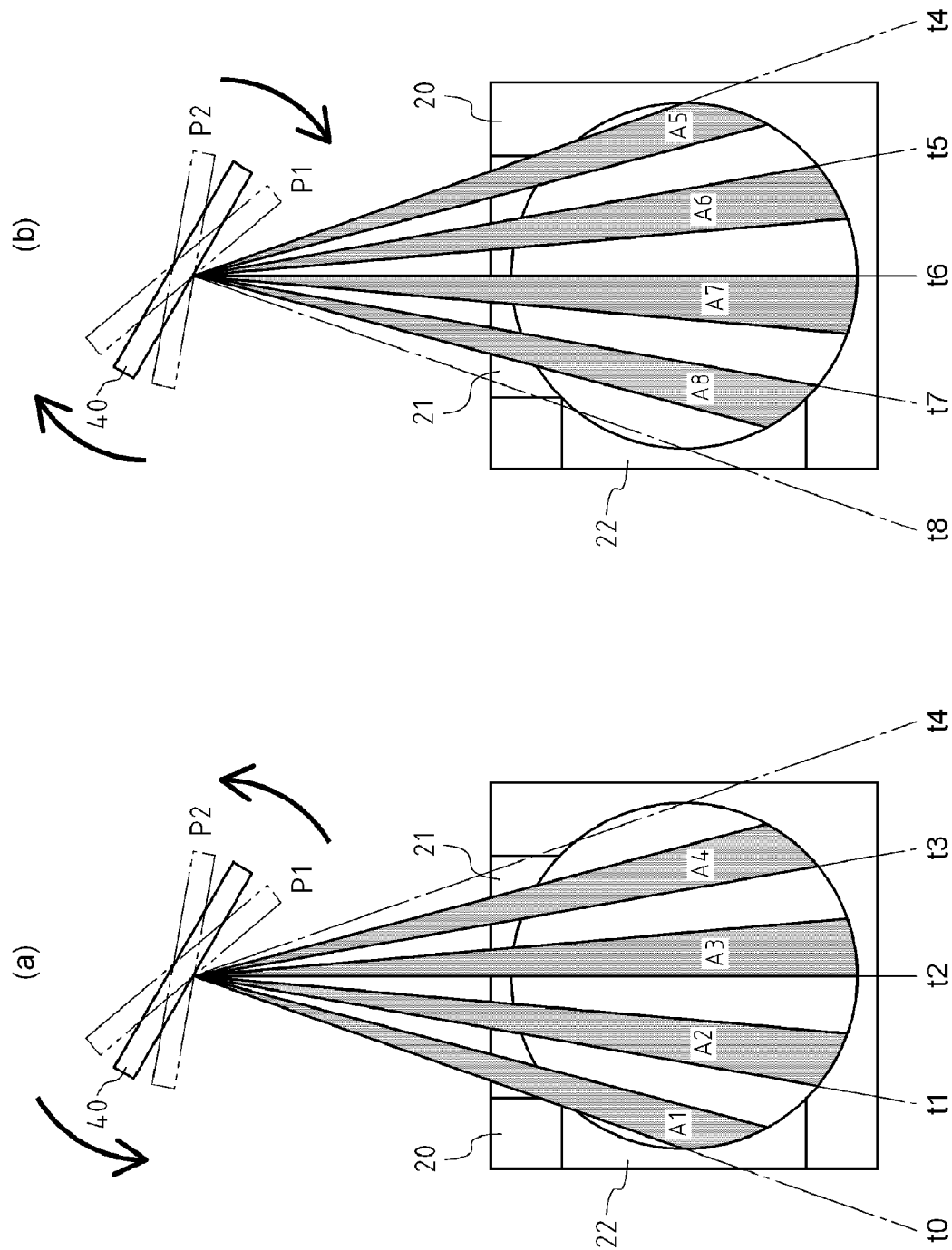
FIG. 3 shows how the laser distributor distributes a laser beam, and when the imaging device takes images.

As shown in FIG. 3, the processor 90 causes the laser distributor 40 to turn in a predetermined range (range from a position P1 to a position P2 of the laser distributor 40 indicated by the two-dot line in FIG. 3) so that the sheet-like laser reflected by the laser distributor 40 traverses the whole area in the front-rear direction in the laser introduction duct 20.

If the position P1 in FIG. 3 is assumed to be an initial position of the laser distributor 40, the time elapsing before the laser distributor 40 turns to the position P2 and returns to the position P1 (one round trip) corresponds to one period (defined as "a period T [s]") of the laser distributor 40. In other words, the period T [s] is the time required for the sheet-like laser reflected by the laser distributor 40 to make one round trip over the whole area in the front-rear direction in the laser introduction duct 20.

After dividing the period T [s] into n (in the present embodiment, n=8) equal parts, let t0 denote a time when the laser distributor 40 is at the position P1 as the initial position, let t1 denote a time after a lapse of T/n [s] from t0, let t2 denote a time after a lapse of T/n [s] from t1, let t3 denote a time after a lapse of T/n [s] from t2, let t4 denote a time after a lapse of T/n [s] from t3, namely a time when the laser distributor 40 arrives at the position P2, let t5 denote a time after a lapse of T/n [s] from t4, let t6 denote a time after a lapse of T/n [s] from t5, let t7 denote a time after a lapse of T/n [s] from t6, let t8 denote a time after a lapse of T/n [s] from t7, namely a time when the laser distributor 40 returns to the position P1. In this case, as shown in FIG. 3(a), the laser distributor 40 turns from the position P1 to the position P2 for a time (T/2 [s]) from t1 to t4, and this turning path corresponds to an outward path of the sheet-like laser in the period T [s]. Moreover, as shown in FIG. 3(b), the laser distributor 40 turns from the position P2 to the position P1 for a time (T/2 [s]) from t4 to t8, and this turning path corresponds to a return path of the sheet-like laser in the period T [s].

The laser distributor 40 turns in this manner, and thereby the sheet-like laser extending along the flow direction of the exhaust gas traverses the whole area in the front-rear direction in the laser introduction duct 20 for T/2 [s].

The processor 90 causes the imaging device 50 to takes an image of a section of the internal space of the laser introduction duct 20 cut by the sheet-like laser through the imaging window 22 of the laser introduction duct 20 n (in the present embodiment, n=8) times for the period T [s] at regular time intervals.

Specifically, after setting an exposure time (shutter speed) of the imaging device 50 to fifty percent of T/n [s] (T/2n [s]), the imaging device 50 images for T/2n [s] from t0 (see an area indicated by A1 in FIG. 3(a)), images for T/2n [s] from t1 (see an area indicated by A2 in FIG. 3(a)), images for T/2n [s] from t2 (see an area indicated by A3 in FIG. 3(a)), images for T/2n [s] from t3 (see an area indicated by A4 in FIG. 3(a)), images for T/2n [s] from t4 (see an area indicated by A5 in FIG. 3(a)), images for T/2n [s] from t5 (see an area indicated by A6 in FIG. 3(a)), images for T/2n [s] from t6 (see an area indicated by A7 in FIG. 3(a)), and images for T/2n [s] from t7 (see an area indicated by A8 in FIG. 3(a)).

Figure 4:
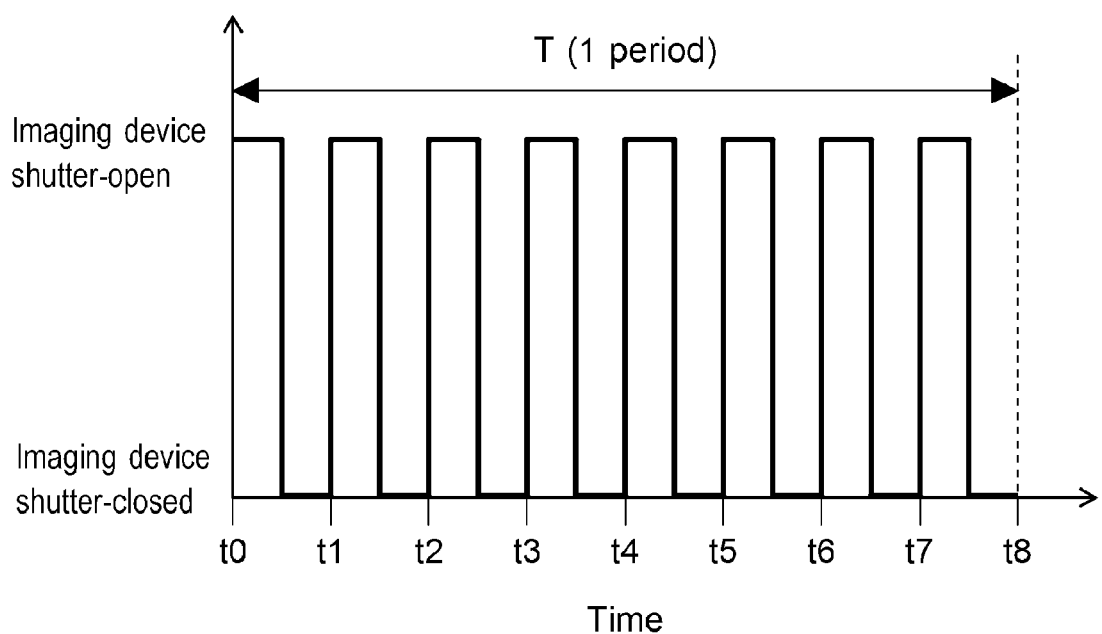
FIG. 4 shows timing when the imaging device takes images.

A state of a shutter of the imaging device 50 at this time is shown in FIG. 4.

As shown in FIG. 4, the shutter of the imaging device 50 opens for T/2n [s] from t0, for T/2n [s] from t1, for T/2n [s] from t2, for T/2n [s] from t3, for T/2n [s] from t4, for T/2n [s] from t5, for T/2n [s] from t6, and for T/2n [s] from t7, and closes over the other times.

Thus, the whole area in the front-rear direction in the laser introduction duct 20 is imaged by taking n images on the outward path and the return path which the sheet-like laser traces for the period T [s] while synchronizing the timing of imaging by the imaging device 50 with 1/n of the period T [s] of the laser distributor 40 after setting the exposure time (shutter speed) of the imaging device 50 to fifty percent of T/n [s] (T/2n [s]).

This makes it possible to grasp the flow of the exhaust gas at different positions in the front-rear direction in the laser introduction duct 20, and to image the whole internal space of the laser introduction duct 20.

In the present embodiment, the time for which the imaging device 50 takes each image is set to a half of one of n equal parts into which the one period is divided, namely T/2n [s], but is not limited to this as long as the time is shorter than one of n equal parts into which the one period is divided.

Figure 5:
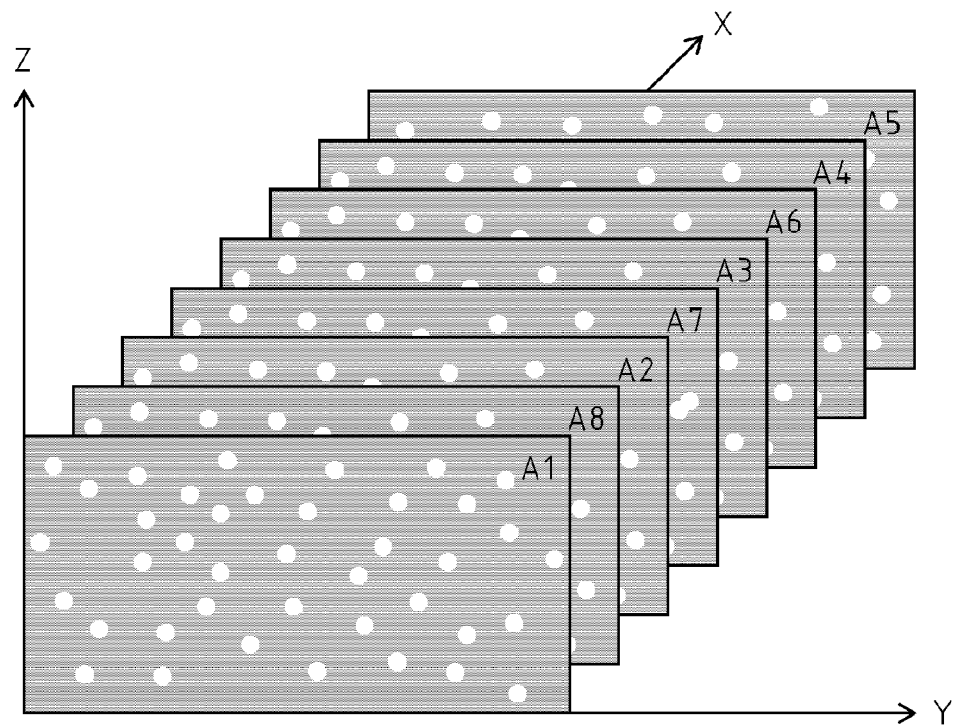
FIG. 5 illustrates a plurality of images taken by the imaging device for one period.

The n (in the present embodiment, n=8) images taken by the imaging device 50 are shown in FIG. 5.

The n images on Y-Z plane (a plane defined by the flow direction of the exhaust gas and the top-bottom direction) are arranged along X-axis (the front-rear direction). A1 to A8 in FIG. 5 correspond to A1 to A8 in FIG. 3. An image taken in the area indicated by A1 is hereinafter referred to as "a first image", an image taken in the area indicated by A2 is hereinafter referred to as "a second image", an image taken in the area indicated by A3 is hereinafter referred to as "a third image", an image taken in the area indicated by A4 is hereinafter referred to as "a fourth image", an image taken in the area indicated by A5 is hereinafter referred to as "a fifth image", an image taken in the area indicated by A6 is hereinafter referred to as "a sixth image", an image taken in the area indicated by A7 is hereinafter referred to as "a seventh image", and an image taken in the area indicated by A8 is hereinafter referred to as "an eighth image". These images are arranged, taking positions thereof in the front-rear direction in the laser introduction duct 20 into consideration, in the following order: the first image, the eighth image, the second image, the seventh image, the third image, the sixth image, the fourth image, and the fifth image. The n images arranged in this manner represent a state of the exhaust gas in the whole internal space of the laser introduction duct 20.

Note that a plurality of whitewashed circles indicate the tracers mixed in the exhaust gas.

As shown in FIG. 2, the processor 90 is electrically connected with the absolute manometers 60, the air-fuel ratio meter 70, and the temperature measuring device 80. The processor 90 calculates the mass flow rate M [kg/s] of the exhaust gas in the flow rate measuring apparatus 1 from the absolute pressure Pm [kPa (abs)] of the exhaust gas measured by the absolute manometers 60, the air-fuel ratio Rm of the exhaust gas measured by the air-fuel ratio meter 70, and the instantaneous temperature Tm [° C.] of the exhaust gas measured by the temperature measuring device 80.

With reference to FIGS. 6 to 15, described below are details about calculation of the mass flow rate M [kg/s] of the exhaust gas by the processor 90.

Figure 6:
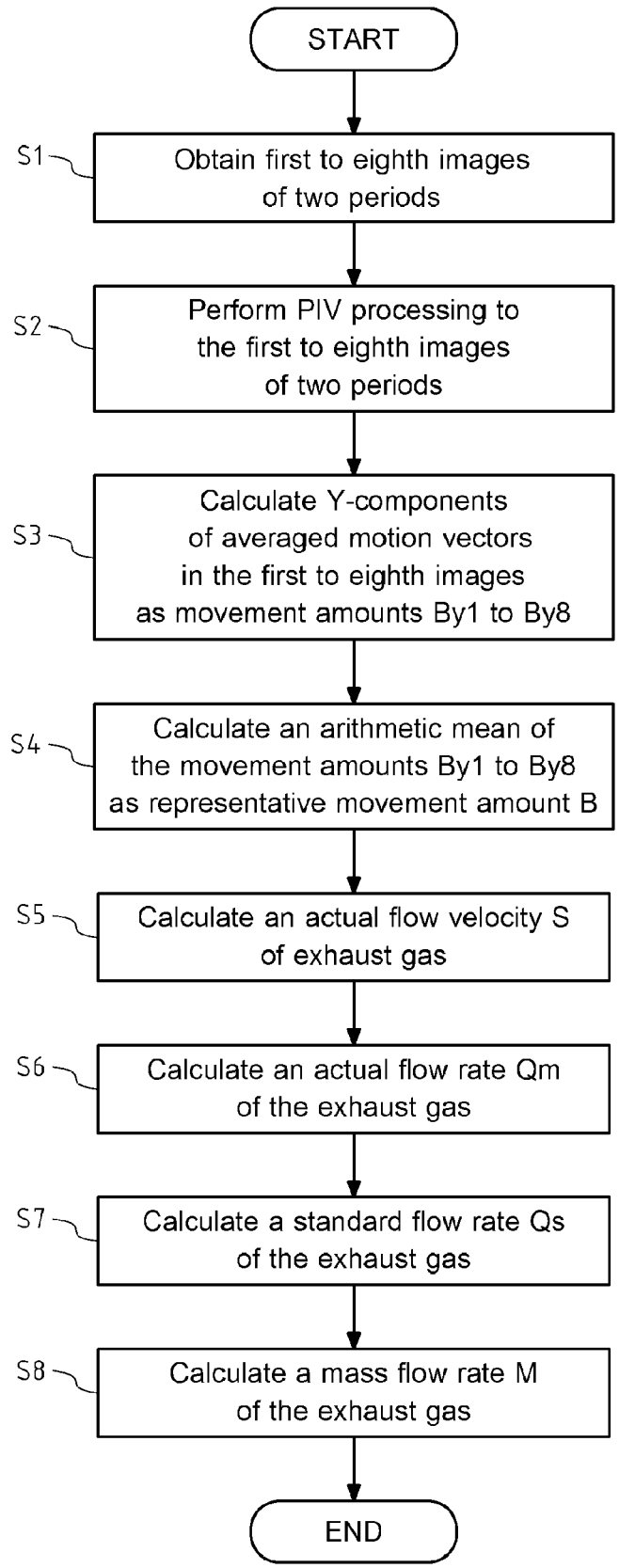
FIG. 6 is a flowchart showing a step for calculating a mass flow rate of an exhaust gas.
Figure 7:
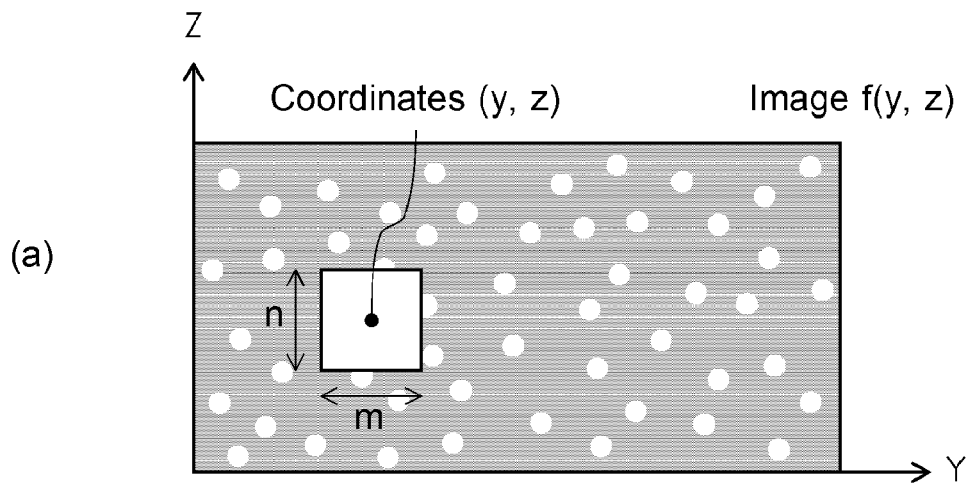
Figure 7:
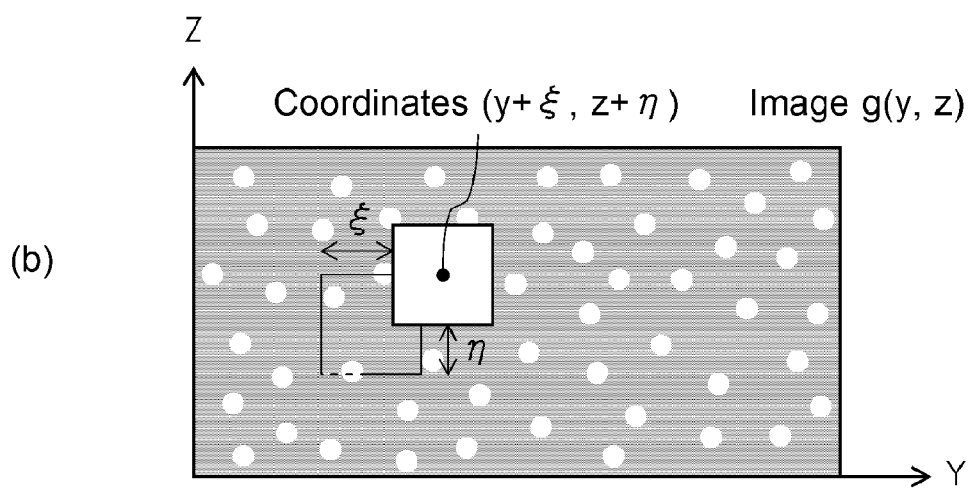
Figure 7:
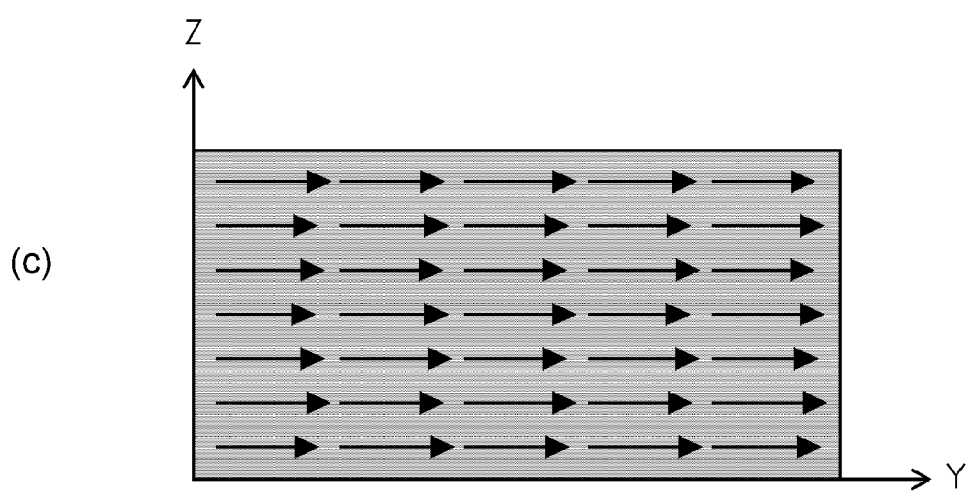
Figure 8:
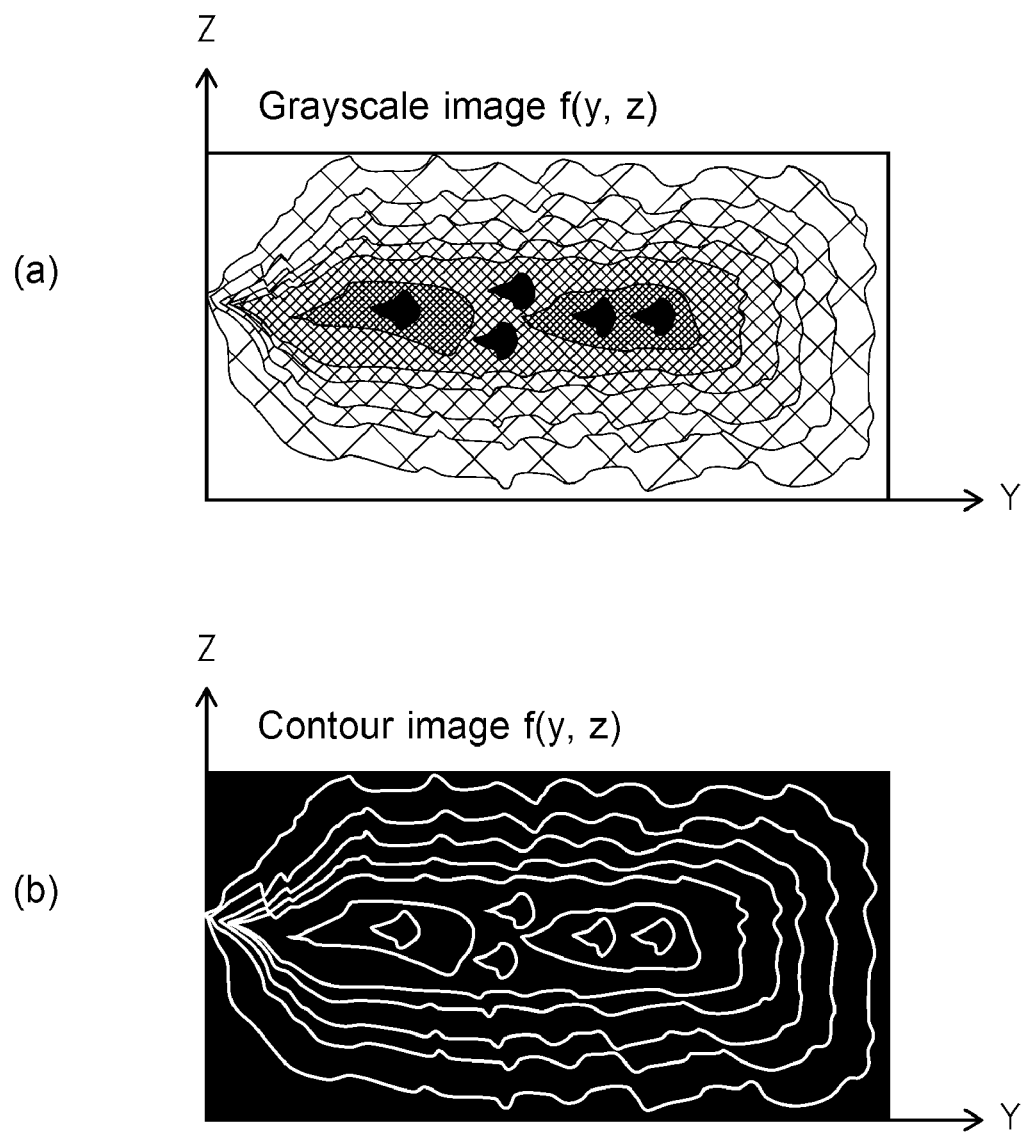

As shown in FIG. 6, in a step S1, the processor 90 obtains the first to eighth images of continuous two periods taken by the imaging device 50, namely a total of sixteen images.

Specifically, the processor 90 causes the imaging device 50 to take the first to eighth images for the period T [s] again after causing the imaging device 50 to take the first to eighth images for the period T [s], thereby obtaining the first to eighth images of the two periods.

In the first to eighth images taken in this manner, a time interval of the period T [s] exists between an image taken during a first period and a corresponding image taken during a second period.

The processor 90 performs a step S2 after obtaining the first to eighth images of the two periods.

In the step S2, the processor 90 performs PIV (Particle Image Velocimetry) processing with respect to the first to eighth images of the two periods.

The PIV processing is a method for calculating movement amounts at predetermined positions in fluid by performing pattern-matching of two images obtained by imaging fluid (the exhaust gas in the present embodiment) at first and second points in time apart from each other at a minute time interval. In the present embodiment, the time interval between the first and second points in time is the period T [s].

PIV processing by cross correlation method is described below.

As shown in FIG. 7(a), let f(y, z) denote an image taken at the first point in time, and as shown in FIG. 7(b), let g(y, z) denote an image taken at the second point in time posterior to the first point in time.

As shown in Math. 1, coordinates (y+$\xi$, z+$\eta$) in which a cross correlation coefficient $R_{fg}$ is maximum are extracted while an area of m by n pixels centered about coordinates (y, z) in the image g(y, z) is moved relative to an area of m by n pixels centered about coordinates (y, z) in the image f(y, z).

This process is repeated, and thereby the movement amounts of the fluid between the first and second points in time may be calculated as shown in FIG. 7(c). Note that black-painted arrows in FIG. 7(c) indicate motion vectors of the fluid.

$$R_{fg}(y, z, \xi, \eta) = \frac{\sum_{i=0}^{n-1}\sum_{j=0}^{m-1} \{f(y+i, z+j) - \overline{f}\} \times \{g(y+i+\xi, z+j+\eta) - \overline{g}\}}{\sqrt{\sum_{i=0}^{n-1}\sum_{j=0}^{m-1} \{f(y+i, z+j) - \overline{f}\}^2 \times \sum_{i=0}^{n-1}\sum_{j=0}^{m-1} \{g(y+i+\xi, z+j+\eta) - \overline{g}\}^2}}$$ [Math. 1]

$$\overline{f} = \frac{\sum_{i=0}^{n-1}\sum_{j=0}^{m-1} f(y+i, z+j)}{n \times m},$$

$$\overline{g} = \frac{\sum_{i=0}^{n-1}\sum_{j=0}^{m-1} f(y+i+\xi, z+j+\eta)}{n \times m}$$

The flow rate measuring apparatus 1 performs PIV processing different from the conventional PIV processing by cross correlation method mentioned above. The PIV processing in the flow rate measuring apparatus 1 is described below.

First, the image f(y, z) with shading distribution, and the image g(y, z) with shading distribution are obtained. These images may be obtained by using not a matter which is generally used as a tracer mixed in the exhaust gas in PIV processing but smoke of a cigarette or a stick of incense.

In the present embodiment, when the step S1 in FIG. 6 is performed, the smoke is mixed in the exhaust gas.

Next, the image f(y, z) with shading distribution, and the image g(y, z) with shading distribution are converted into images (hereinafter referred to as "a grayscale image f(y, z)" and "a grayscale image g(y, z)") with such a gradation (e.g. 5 to 10 shades of gray) that the information for shading is not lost.

FIG. 8(a) illustrates the grayscale image f(y, z).

Then, with respect to the grayscale image f(y, z) and the grayscale image g(y, z), a binarization is performed after edge detection by Laplacian filter or the like. Thereby, images (hereinafter referred to as "a contour image f(y, z)" and "a contour image g(y, z)") are generated in which contours of shading extracted from the grayscale image f(y, z) and the grayscale image g(y, z) are drawn.

FIG. 8(b) illustrates the contour image f(y, z).

Finally, the PIV processing is performed with respect to the contour image f(y, z) and the contour image g(y, z) using Math. 2 mentioned below.

$$R_{fg}(y, z, \xi, \eta) = \frac{\sum_{i=0}^{n-1}\sum_{j=0}^{m-1} f(y+i, z+j) \cap g(y+i+\xi, z+j+\eta)}{\sqrt{\sum_{i=0}^{n-1}\sum_{j=0}^{m-1} f(y+i, z+j)}}$$ [Math. 2]

Thus, the PIV processing in the flow rate measuring apparatus 1 is different from the conventional PIV processing, and is performed with respect to the contour image f(y, z) and the contour image g(y, z) having relatively small information volume by means of a logical operation in Math. 2 mentioned above, thereby enabling to reduce a time required to perform the PIV processing.

Therefore, it is possible to adopt DSP or CPU for calculation with relatively low processing-speed as the processor 90 in the present embodiment, and consequently to reduce a cost for producing the flow rate measuring apparatus 1.

Moreover, even if the images (the image f(y, z) and the image g(y, z)) used for the PIV processing have such large size that the conventional PIV processing is not performed thereto, the PIV processing can be performed thereto.

In the step S2 (see FIG. 6), the processor 90 performs the PIV processing with respect to the first to eighth images of the two periods as mentioned above.

Figure 9:
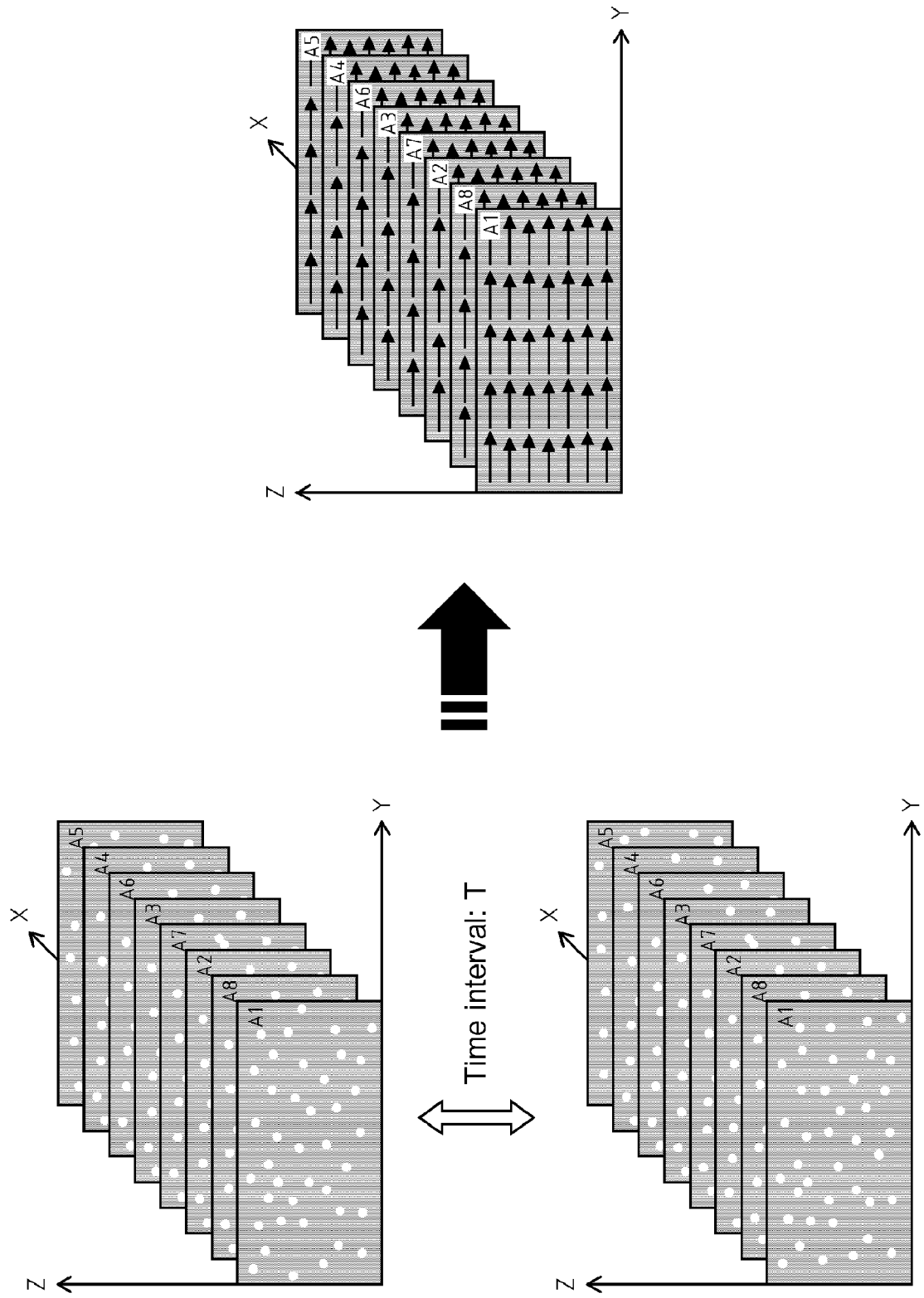
FIG. 9 shows how PIV processing according to the present invention is performed.

Thereby, as shown in FIG. 9, motion vectors of the exhaust gas for the period T [s] at a plurality of positions in each of the first to eighth images can be obtained from the first to eighth images of the two periods taken at the time interval of the period T [s]. Note that black-painted arrows on the first to eighth images in FIG. 9 indicate the motion vectors of the exhaust gas.

The motion vectors, calculated in this manner, of the exhaust gas at the plurality of positions in each of the first to eighth images may include erroneous vectors caused by not the proper tracers but matters (hereinafter referred to as "disturbance matters") such as water drops into which vapor condenses, unburned fuel and engine oil present in the exhaust gas. This is because, if the exhaust gas in the laser introduction duct 20 is irradiated with a laser, the light is scattered by the disturbance matters as well as by the tracers.

In order to eliminate the above-mentioned influence of the disturbance matters, the erroneous vectors are removed from among the motion vectors of the exhaust gas at the plurality of positions in each of the first to eighth images. A method for removing the erroneous vectors is described below.

It is impossible to distinguish between the tracers and the disturbance matters directly from the first to eighth images. However, as shown in FIG. 10, there is a relatively wide difference, between the tracers and the disturbance matters, in time constant $\tau_p$ (hereinafter referred to as "particle time constant $\tau_p$") representing a time which it takes the velocity of particles (in the present embodiment, the tracers and the disturbance matters) present in fluid (in the present embodiment, the exhaust gas) to reach sixty three present of the velocity of the fluid when the fluid begins to flow from the stationary state. Therefore, as mentioned below, it is possible to remove the erroneous vectors from among the motion vectors of the exhaust gas at the plurality of positions in each of the first to eighth images by using a phenomenon caused by the difference between the particle time constant $\tau_p$ of the tracers and the particle time constant $\tau_p$ of the disturbance matters.

The particle time constant $\tau_p$ is calculated using Math. 3 mentioned below.

$$\tau_p = \frac{(2\rho_p + \rho_f)d^2}{36\,\mu}$$ [Math. 3]

$\tau_p$: Particle time constant $\rho_p$: Density (Particle)

$\rho_f$: Density (Fluid)

$d$: Diameter (Particle)

$\mu$: Viscosity (Fluid)

Figure 11:
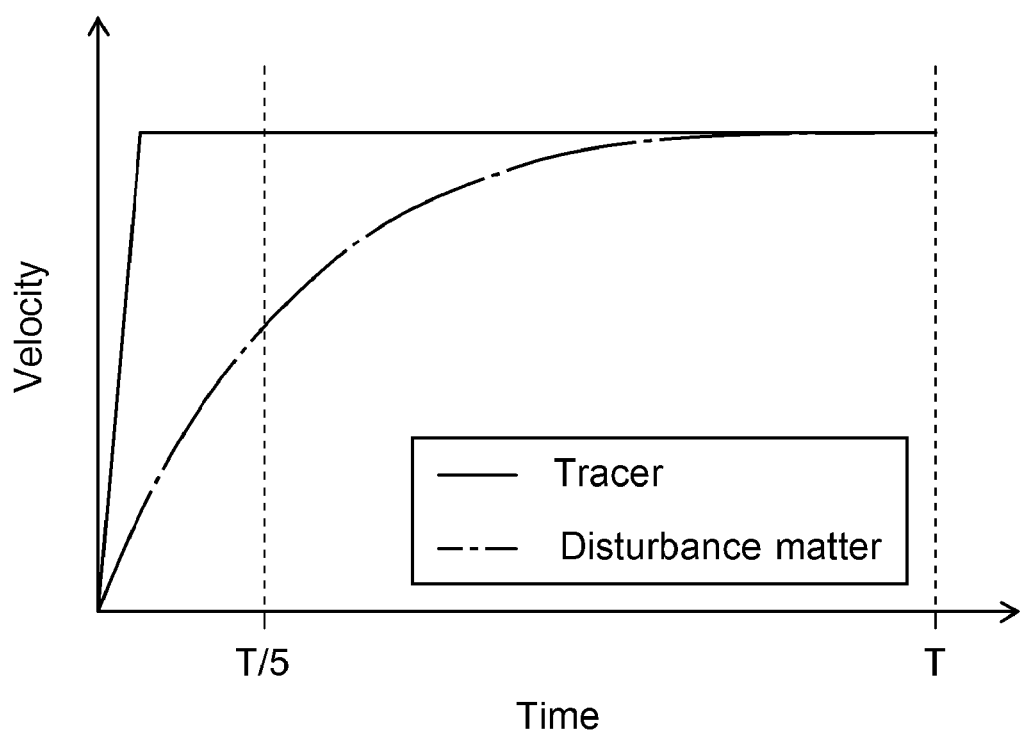
FIG. 11 shows a difference between a time required for the tracer to reach a predetermined velocity and a time required for the disturbance matter to reach the predetermined velocity.
Figure 12:
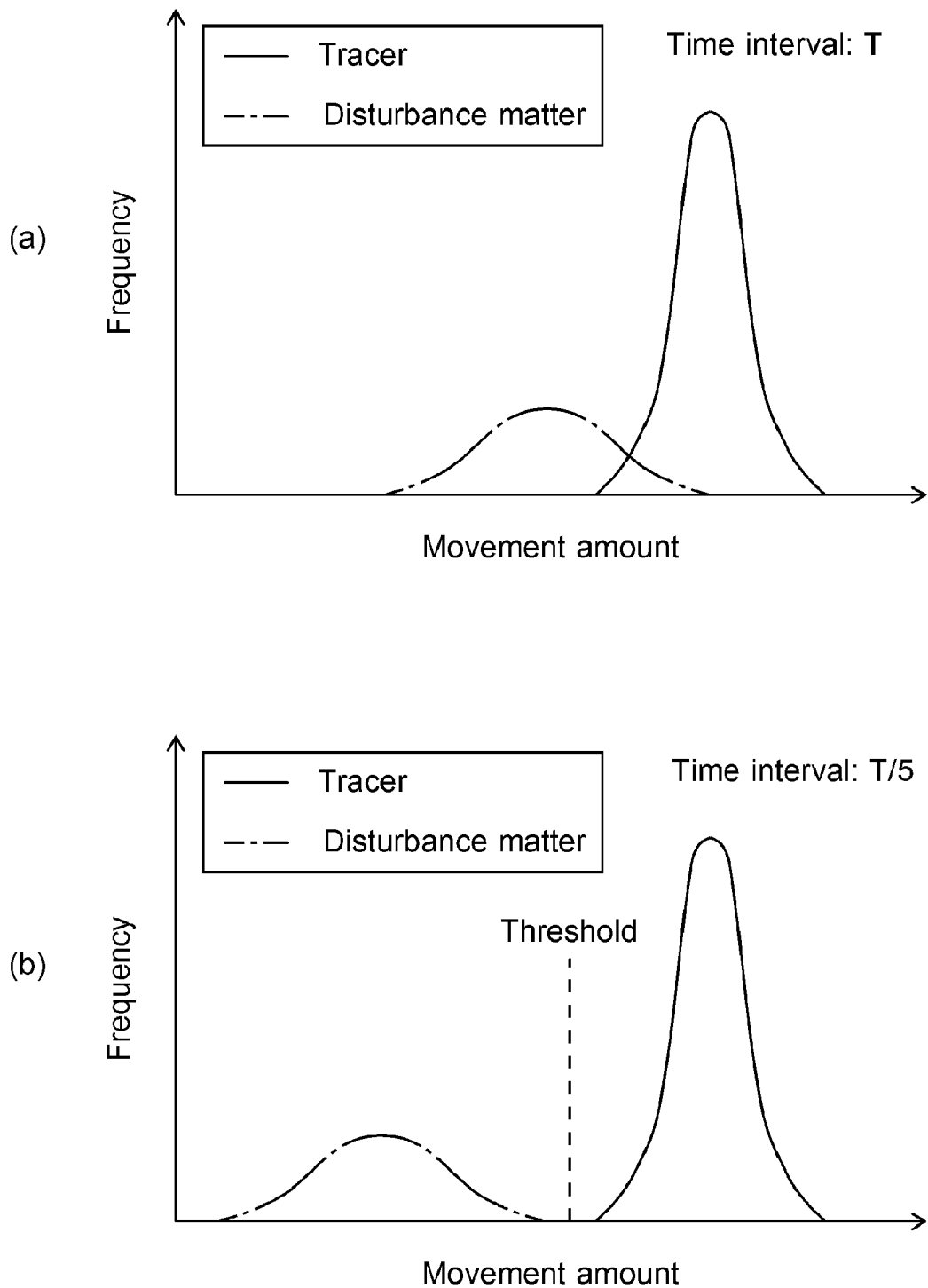

As shown in FIG. 11, since the disturbance matters have the particle time constant τ$_p$ larger than that of the tracers, the time which it takes the velocity of the disturbance matters to reach a predetermined velocity is long, and the movement amount thereof calculated in the PIV processing are small. Therefore, it is possible to determine the motion vector in which the movement amount is a predetermined value or less as the erroneous vector.

However, in the case where the time to calculate the motion vectors of the exhaust gas, namely the time interval between two images to which the PIV processing is performed is the period T [s], there is a relatively small difference between the movement amounts of the tracers and the movement amounts of the disturbance matters when the fluid begins to flow from the stationary state. Therefore, as shown in FIG. 12(a), distribution of the tracers overlaps with distribution of the disturbance matters, which makes it difficult to determine a threshold for distinguishing the erroneous vectors.

As shown in FIG. 11, the time to calculate the motion vectors of the exhaust gas, namely the time interval between two images to which the PIV processing is performed is set to a value (in the present embodiment, T/5 [s]) less than the period T [s] to widen the difference between the movement amounts of the tracers and the movement amounts of the disturbance matters. Thereby, as shown in FIG. 12(b), the distribution of the tracers is separated from the distribution of the disturbance matters.

This makes it possible to determine the threshold for distinguishing the erroneous vectors, and to remove the erroneous vectors from among the plurality of motion vectors of the exhaust gas.

In the present embodiment, adopted as the threshold for distinguishing the erroneous vectors is the arithmetic mean of the median of the movement amounts in the distribution of the tracers, and the median of the movement amounts in the distribution of the disturbance matters.

In the present embodiment, the time to calculate the motion vectors of the exhaust gas is set to T/5 [s] when the threshold for distinguishing the erroneous vectors is determined, but is not limited to this as long as the difference between the movement amounts of the tracers and the movement amounts of the disturbance matters appears remarkably.

A method for removing the erroneous vectors is concretely described.

First, the PIV processing in which the time interval is a period (in the present embodiment, T/5 [s]) shorter than the period T [s] is performed separately from the main PIV processing in which the time interval is the period T [s].

Next, the threshold for distinguishing the erroneous vectors is determined on the basis of the distribution of the tracers and the distribution of the disturbance matters.

Then, the erroneous vectors are distinguished on the basis of the determined threshold, and coordinates of each erroneous vector are stored.

Figure 13:
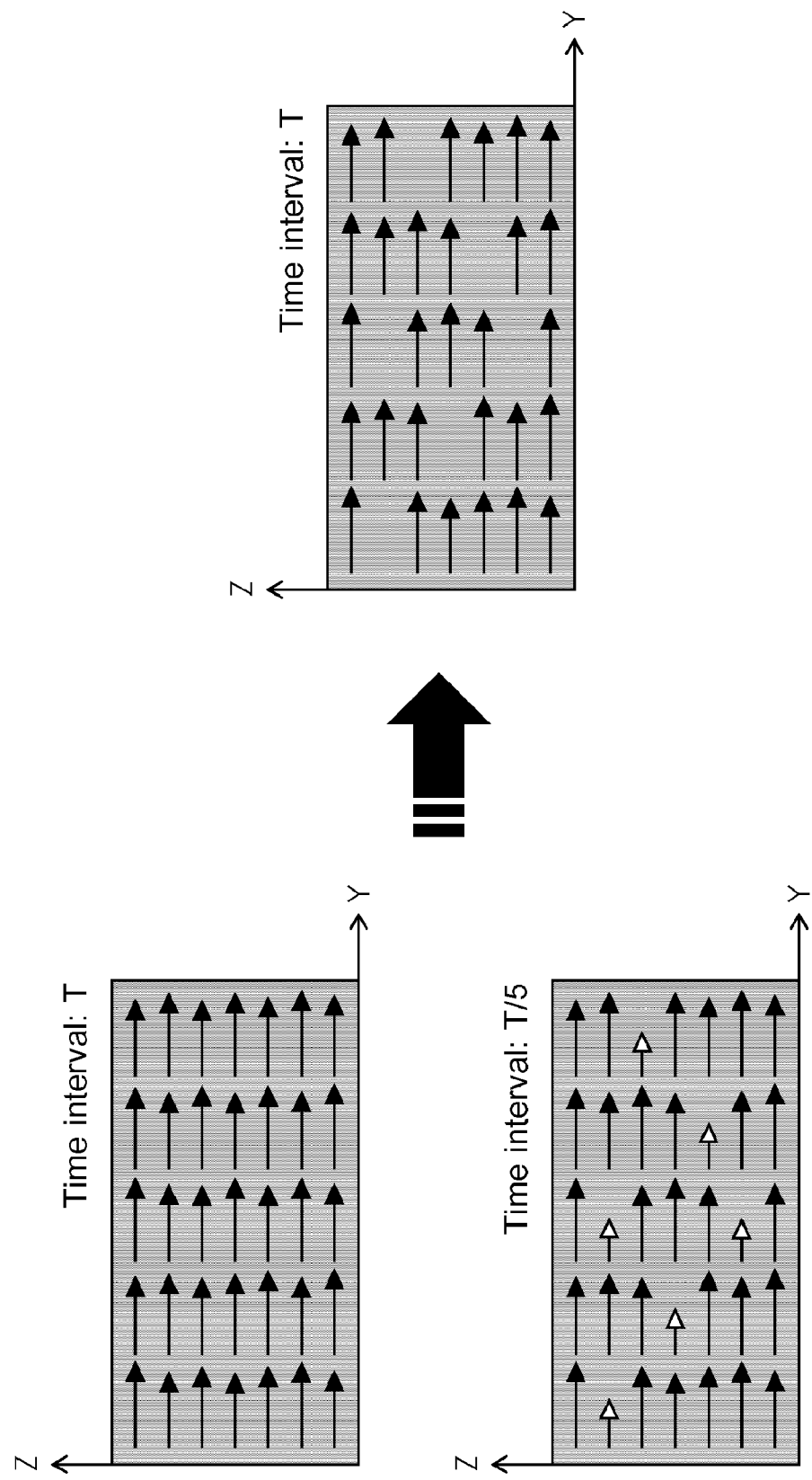
FIG. 13 shows how erroneous vectors are removed.

Finally, as shown in FIG. 13, the motion vectors coinciding in coordinates with the erroneous vectors are removed from among the motion vectors of the exhaust gas at the plurality of positions calculated by the main PIV processing in which the time interval is the period T [s].

The above-mentioned processing is performed with respect to the first to eighth images to remove the erroneous vectors in the first to eighth images, thus enabling to reduce errors caused by the disturbance matters in the PIV processing.

The processor 90 performs a step S3 after performing the PIV processing including the removal of the erroneous vectors.

As shown in FIG. 6, in the step S3, the processor 90 averages the motion vectors of the exhaust gas at the plurality of positions in the first image into one motion vector, and Y-component of the one motion vector is calculated as a movement amount By1 [m]. In the same manner, a movement amount By2 [m] is calculated in the second image, a movement amount By3 [m] is calculated in the third image, a movement amount By4 [m] is calculated in the fourth image, a movement amount By5 [m] is calculated in the fifth image, a movement amount By6 [m] is calculated in the sixth image, a movement amount By7 [m] is calculated in the seventh image, and a movement amount By8 [m] is calculated in the eighth image.

The processor 90 performs a step S4 after calculating the movement amounts By1 [m] to By8 [m].

In the step S4, the processor 90 calculates an arithmetic mean of the movement amounts By1 [m] to By8 [m] as a representative movement amount B [m].

The processor 90 performs a step S5 after calculating the representative movement amount B [m].

In the step S5, the processor 90 calculates, using Math. 4 mentioned below, a flow velocity S [m/s] (hereinafter referred to as "an actual flow velocity S [m/s]") of the exhaust gas in an actual environment.

The processor 90 performs a step S6 after calculating the actual flow velocity S [m/s] of the exhaust gas.

$$S \text{ [m/s]} = B \text{ [m]}/T \text{ [s]} \qquad \text{[Math. 4]}$$

In the step S6, the processor 90 calculates, using Math. 5 mentioned below, a flow rate Qm [m$^3$/s] (hereinafter referred to as "an actual flow rate Qm [m$^3$/s]") of the exhaust gas in the actual environment.

Note that A [m$^2$] in Math. 5 indicates an area of a flow path of the exhaust gas, namely an area of a section, perpendicular to the flow direction of the exhaust gas, of the internal space of the laser introduction duct 20.

The processor 90 performs a step S7 after calculating the actual flow rate Qm [m$^3$/s] of the exhaust gas.

$$Qm \text{ [m}^3\text{/s]} = A \text{ [m}^2\text{]} \times S \text{ [m/s]} \qquad \text{[Math. 5]}$$

In the step S7, the processor 90 calculates, using Math. 6 mentioned below, a volumetric flow rate Qs [m$^3$/s] (hereinafter referred to as "a standard flow rate Qs [m$^3$/s]") of the exhaust gas in a standard condition (20° C., 1 atm).

The actual flow rate Qm [m$^3$/s] of the exhaust gas calculated in the step S6 is converted into the standard flow rate Qs [m$^3$/s] which is the volumetric flow rate in the standard condition because the actual flow rate Qm [m$^3$/s] varies depending on temperature and pressure.

Note that Pm [kPa (abs)] in Math. 6 is the absolute pressure Pm [kPa (abs)] of the exhaust gas measured by the absolute manometers 60 as mentioned previously. The measurement of the absolute pressure Pm [kPa (abs)] of the exhaust gas by the absolute manometers 60 is performed before the step S7 (e.g. in parallel with the step S2).

Moreover, Tm [° C.] in Math. 6 is the instantaneous temperature Tm [° C.] of the exhaust gas measured by the temperature measuring device 80 as mentioned previously. The instantaneous temperature Tm [° C.] is, as mentioned previously, not directly measured by the temperature measuring device 80, and is calculated from the pressure of the exhaust gas flowing through the bypass 81 which is measured by the manometer 82, the air-fuel ratio Rm and the like. The calculation of the instantaneous temperature Tm [° C.] of the exhaust gas is performed before the step S7 (e.g. in parallel with the step S2).

$$Qs[m^3/s] = \frac{273.15 + 20 \ [° C.]}{273.15 + Tm[° C.]} \times \frac{Pm[kPa \cdot abs]}{101.325 \ [kPa]} \times Qm[m^3/s] \qquad [\text{Math. 6}]$$

A method for calculating the instantaneous temperature Tm [° C.] of the exhaust gas is described in detail.

Figure 14:
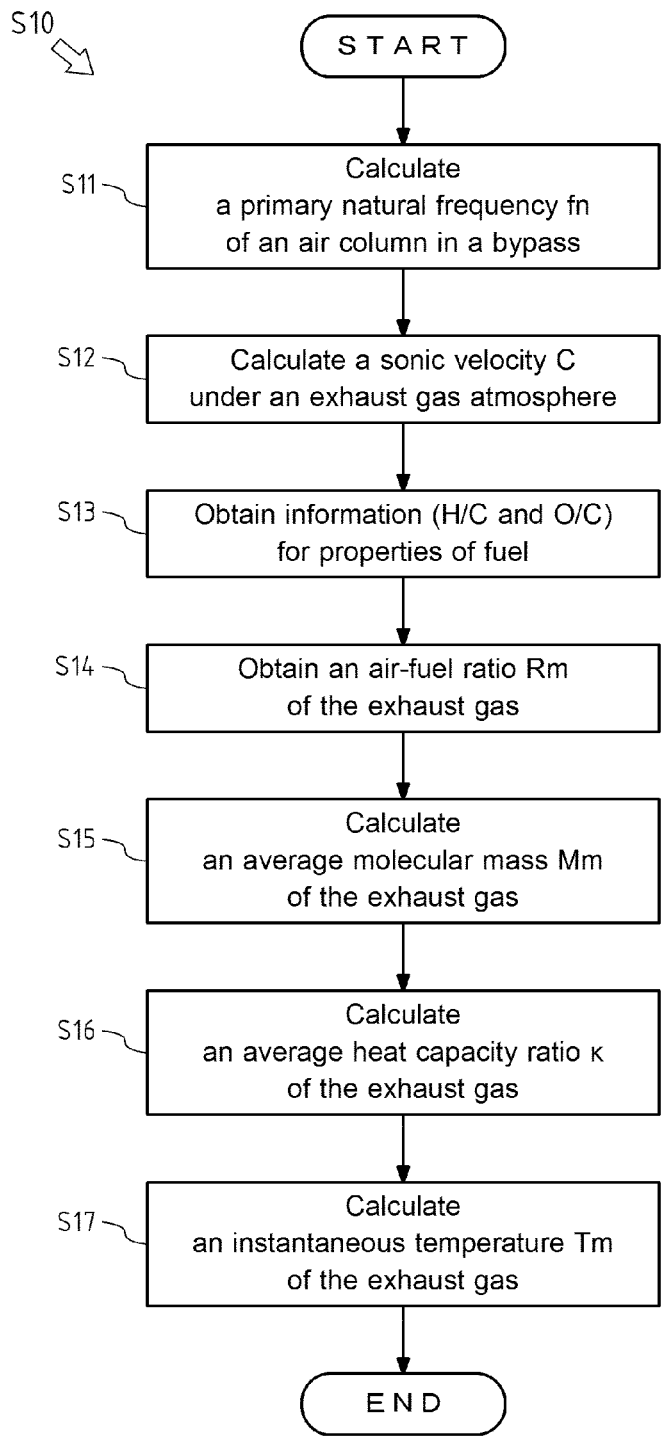
FIG. 14 is a flowchart showing a step for calculating an instantaneous temperature of the exhaust gas.

As shown in FIG. 14, the instantaneous temperature Tm [° C.] of the exhaust gas is calculated through a step S10.

In the step S10, steps S11 to S17 are sequentially performed.

In the step S11, the processor 90 calculates a primary natural frequency fn [Hz] of an air column in the bypass 81.

Specifically, the processor 90 performs FFT (Fast Fourier Transform) with respect to the pressure of the exhaust gas flowing through the bypass 81 which is measured by the manometer 82, and extracts a frequency in which a gain is maximum as the primary natural frequency fn [Hz] of the air column in the bypass 81.

The processor 90 performs the step S12 after calculating the primary natural frequency fn [Hz].

In the step S12, the processor 90 calculates a sonic velocity C [m/s] under the exhaust gas atmosphere.

Specifically, the processor 90 calculates a sonic velocity Cb [m/s] in the bypass 81 by substituting the primary natural frequency fn [Hz] calculated in the step S11 into Math. 7 mentioned below, and then calculates the sonic velocity C [m/s] under the exhaust gas atmosphere by substituting the sonic velocity Cb [m/s] into Math. 8 mentioned below.

Note that L [m] in Math. 7 indicates a length of the bypass 81 in the longitudinal direction (the flow direction of the exhaust gas).

Moreover, d [m] in Math. 8 indicates an internal diameter of the bypass 81.

$$Cb \ [m/s] = 2 \times L \ [m] \times fn \ [Hz] \qquad [\text{Math. 7}]$$

$$C \ [m/s] = Cb \ [m/s]/(1 - 0.3/d \ [m]/\sqrt{fn[Hz]}) \qquad [\text{Math. 8}]$$

The processor 90 performs the step S13 after calculating the sonic velocity C [m/s].

In the step S13, the processor 90 obtains H/C (an atomic ratio of hydrogen to carbon) and O/C (an atomic ratio of oxygen to carbon) each of which is the information for properties of the fuel as a source of the exhaust gas in the flow rate measuring apparatus 1. Note that the information is predetermined according to a kind of the fuel.

The processor 90 performs the step S14 after obtaining H/C and O/C.

In the step S14, the processor 90 obtains the air-fuel ratio Rm of the exhaust gas measured by the air-fuel ratio meter 70.

The processor 90 performs the step S15 after obtaining the air-fuel ratio Rm of the exhaust gas.

In the step S15, the processor 90 calculates an average molecular mass Mm [kg/mol] of the exhaust gas on the basis of a molar fraction of each element ($N_2$, $O_2$, $CO_2$, $H_2O$, CO, and $H_2$) of the exhaust gas.

Described is a method for calculating the molar fraction of each element ($N_2$, $O_2$, $CO_2$, $H_2O$, CO, and $H_2$) of the exhaust gas necessary to calculate the average molecular mass Mm [kg/mol] of the exhaust gas.

The molar fraction of each element of the exhaust gas is calculated by means of a reaction formula in the case (lean case) where the air-fuel ratio Rm is larger than a theoretical air-fuel ratio R, a reaction formula in the case where the air-fuel ratio Rm is equal to the theoretical air-fuel ratio R, and a reaction formula in the case (rich case) where the air-fuel ratio Rm is smaller than the theoretical air-fuel ratio R.

The theoretical air-fuel ratio R is predetermined according to a kind of the fuel as the source of the exhaust gas in the flow rate measuring apparatus 1.

The reaction formula in the case where the air-fuel ratio Rm obtained in the step S14 is larger than the theoretical air-fuel ratio R, namely in the lean case is shown in Math. 9 mentioned below, where y is H/C obtained in the step S13.

In this case, the equalities, $\phi = R/Rm$, $n = y$, hold, and unknown quantities $\phi$ and n are calculated.

$$\Phi CH_n + (1+n/4)O_2 + (79/21)(1+n/4)N_2 \rightarrow \Phi CO_2 + (1-\Phi)(1+n/4)O_2 + (\frac{1}{2})n\Phi H_2O + (79/21)(1+n/4)N_2 \qquad [\text{Math. 9}]$$

The reaction formula in the case where the air-fuel ratio Rm is equal to the theoretical air-fuel ratio R is shown in Math. 10 mentioned below, where y is H/C obtained in the step S13, and z is O/C obtained in the step S13.

In this case, the equalities, $\phi = 1$, $n = (1 + 0.25y - 0.5\phi)/0.2099$, hold, and unknown quantities $\phi$ and n are calculated.

$$\Phi CH_yO_z + 0.2099nO_2 + (0.7901n)N_2 \rightarrow CO_2 + 0.5yH_2O + (0.7901n)N_2 \qquad [\text{Math. 10}]$$

The reaction formula in the case where the air-fuel ratio Rm obtained in the step S14 is smaller than the theoretical air-fuel ratio R, namely in the rich case is shown in Math. 11 mentioned below.

In this case, the equalities, $\phi = a+b$, $1+n/4 = a+b/2+c/2$, $n\phi = 2c+2d$, $bc/ad = K$, hold, and unknown quantities a, b, c, d, $\phi$ and n are calculated. Note that K represents equilibrium constant.

$$\Phi CH_n + (1+n/4)O_2 + (79/21)(1+n/4)N_2 \rightarrow aCO_2 + bCO + cH_2O + dH_2 + (79/21)(1+n/4)N_2 \qquad [\text{Math. 11}]$$

Thus, the molar fraction of each element ($N_2$, $O_2$, $CO_2$, $H_2O$, CO, and $H_2$) of the exhaust gas is calculated by means of the above-mentioned reaction formulas.

The average molecular mass Mm [kg/mol] of the exhaust gas may be calculated on the basis of the molar fraction of each element ($N_2$, $O_2$, $CO_2$, $H_2O$, CO, and $H_2$) of the exhaust gas calculated as mentioned above.

Specifically, the average molecular mass Mm [kg/mol] of the exhaust gas is calculated by multiplying the molar fraction by the molar mass in each element ($N_2$, $O_2$, $CO_2$, $H_2O$, CO, and $H_2$) of the exhaust gas, and then by totaling each product of the molar fraction and the molar mass.

The processor 90 performs the step S16 after calculating the average molecular mass Mm [kg/mol] of the exhaust gas.

In the step S16, the processor 90 calculates an average heat capacity ratio $\kappa$ of the exhaust gas.

The average heat capacity ratio $\kappa$ may be calculated using Math. 12 mentioned below.

Note that D2 in Math. 12 indicates a percentage of diatomic molecules such as CO, D3 in Math. 12 indicates a percentage of triatomic molecules such as $H_2O$, and these may be calculated on the basis of the result of the step S15.

$$\kappa = 1.4 \times D2 + 1.3 \times D3 \qquad [\text{Math. 12}]$$

The processor 90 performs the step S17 after calculating the average heat capacity ratio $\kappa$ of the exhaust gas.

In the step S17, the processor 90 calculates the instantaneous temperature Tm [C.] of the exhaust gas.

Specifically, first, the processor 90 sets up Math. 13 mentioned below using the sonic velocity C [m/s] calculated in the step S12, the average molecular mass Mm [kg/mol] calculated in the step S15, and the average heat capacity ratio κ calculated in the step S16. Next, the processor 90 transforms Math. 13 into Math. 14 mentioned below. Then, the processor 90 calculates an absolute temperature Ta [K] of the exhaust gas using Math. 14. Finally, the processor 90 calculates the instantaneous temperature Tm [° C.] of the exhaust gas by converting a unit of the absolute temperature Ta [K] of the exhaust gas. Note that R in Math. 13 and Math. 14 indicates gas constant.

$$C = \sqrt{\frac{\kappa \times R \times Ta[K]}{Mm[kg/mol]}}$$ [Math. 13]

$$Ta[K] = Mm[kg/mol] \times (C[m/s])^2 / \kappa / R$$ [Math. 14]

Thus, in the step S10, the instantaneous temperature Tm [° C.] of the exhaust gas is calculated.

It is difficult to directly measure the instantaneous temperature Tm [° C.] highly-responsively by an existing thermometer. However, a manometer (e.g. the manometer 82) capable of responding on several kilohertz is in existence, and based on pressure, the instantaneous temperature Tm [° C.] can accurately be calculated. A benefit of calculating the instantaneous temperature Tm [° C.] of the exhaust gas based on pressure is that temperature can accurately be calculated as long as change of pressure, namely frequency in vibration of an air column is correct if absolute accuracy of pressure is poor. Therefore, it is possible to accurately calculate the instantaneous temperature Tm [° C.] of the exhaust gas in the step S10.

As shown in FIG. 6, the processor 90 performs a step S8 after calculating the standard flow rate Qs [m³/s] of the exhaust gas by substituting the absolute pressure Pm [kPa (abs)] and the instantaneous temperature Tm [° C.] of the exhaust gas into Math. 6 mentioned above.

In the step S8, the processor 90 calculates the mass flow rate M [kg/s] of the exhaust gas using Math. 15 mentioned below.

Note that ρs [kg/m³] in Math. 15 indicates a density ρs [kg/m³] of the exhaust gas. The density ρs [kg/m³] of the exhaust gas is calculated on the basis of the average molecular mass Mm [kg/mol] of the exhaust gas. The calculation of the average molecular mass Mm [kg/mol] of the exhaust gas is performed before the step S7 (e.g. in parallel with the step S2).

$$M [kg/s] = \rho s [kg/m^3] \times Qs [m^3/s]$$ [Math. 15]

A method for calculating the density ρs [kg/m³] of the exhaust gas is described in detail.

Figure 15:
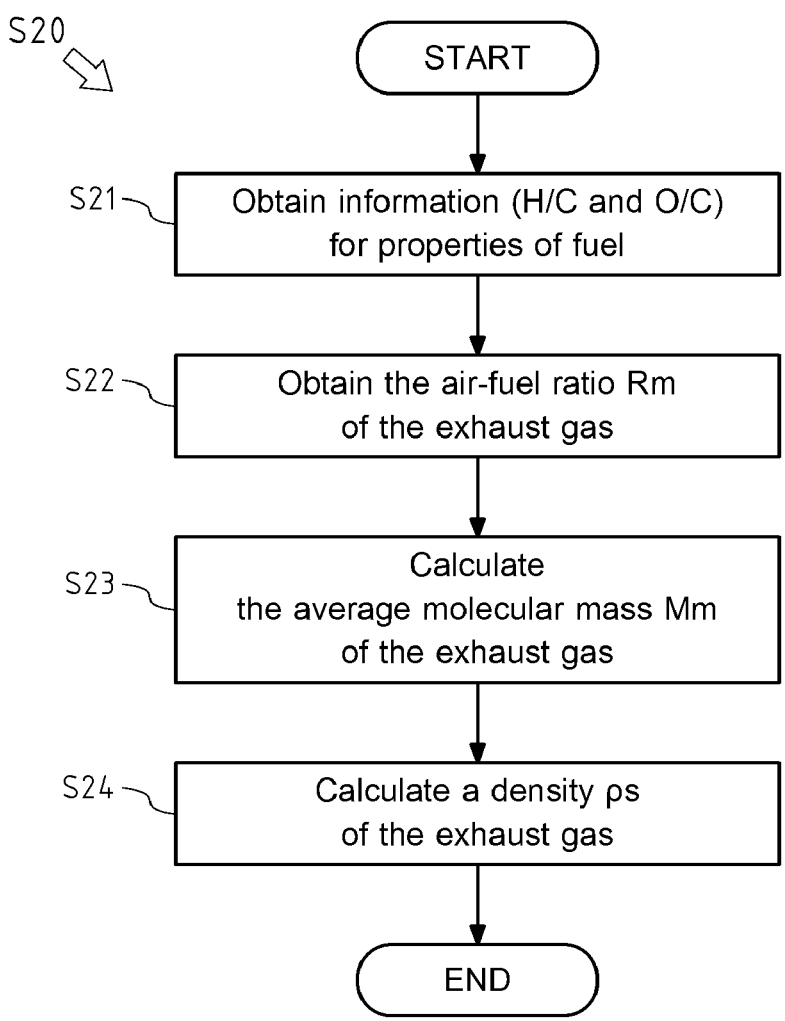
FIG. 15 is a flowchart showing a step for calculating a density of the exhaust gas.

As shown in FIG. 15, the density ρs [kg/m³] of the exhaust gas is calculated through a step S20.

In the step S20, steps S21 to S24 are sequentially performed.

Descriptions for the steps S21 to S23 are omitted because the steps S21 to S23 are similar to the steps S13 to S15 (see FIG. 14) of the step S10.

If the step S10 is performed before the step S20, the results of the steps S13 to S15 may be utilized for the step S20 without performing the steps S21 to S23.

In the step S24, the processor 90 calculates the density ρs [kg/m³] of the exhaust gas.

The density ρs [kg/m³] is calculated by means of the average molecular mass Mm [kg/mol] and a state equation of gas as shown in Math. 16 mentioned below. Note that R in Math. 16 indicates gas constant.

$$\rho s [kg/m^3] = Mm [kg/mol] \times 101.3 [kPa]/R/293.15 [K]$$ [Math. 16]

Thus, in the step S20, the density ρs [kg/m³] of the exhaust gas is calculated.

As mentioned above, the density ρs [kg/m³] of the exhaust gas is calculated on the basis of the information (H/C and O/C) for properties of the fuel, and the air-fuel ratio Rm in an actual operating range.

This makes it possible to accurately calculate the density ρs [kg/m³] of the exhaust gas.

Finally, the processor 90 calculates the mass flow rate M [kg/s] of the exhaust gas by substituting the density ρs [kg/m³] of the exhaust gas calculated in the step S20, and the standard flow rate Qs [m³/s] of the exhaust gas into Math. 15 mentioned above.

In the flow rate measuring apparatus 1, the above-mentioned processing is repeated, and the mass flow rate M [kg/s] is calculated by the processor 90 in real time.

As mentioned above, the flow rate measuring apparatus 1 is configured to measure the mass flow rate M [kg/s] of the exhaust gas from the engine of the car and the like, and includes the laser introduction duct 20 through which the exhaust gas and tracers flow, the laser oscillator 30 which applies the laser beam, the laser distributor 40 which reflects the laser beam applied by the laser oscillator 30 to turn the laser beam into the sheet-like laser such as cuts the internal space of the laser introduction duct 20 along the flow direction of the exhaust gas, and which moves the sheet-like laser in the front-rear direction, the imaging device 50 which takes an image of a section of the internal space of the laser introduction duct 20 cut by the sheet-like laser formed by the laser distributor 40, and the processor 90 which calculates the mass flow rate M [kg/s] of the exhaust gas. The laser distributor 40 causes the sheet-like laser to make one round trip over the whole area in the front-rear direction in the laser introduction duct 20. The imaging device 50 defines a time required for the sheet-like laser to make one round trip in the laser introduction duct 20 as the period T [s], and takes the first to eighth images for the period T [s] at regular time intervals at the exposure time of a half of one of n (in the present embodiment, n=8) equal parts into which the period T [s] is divided while synchronizing a timing of taking the images with one of n equal parts into which the period T [s] is divided. The processor 90 obtains the first to eighth images of the continuous two periods from the imaging device 50, calculates, based on the first to eighth images of the continuous two periods, the motion vectors of the exhaust gas for the period T [s] at the plurality of positions in each image, averages the motion vectors of the exhaust gas at the plurality of positions in each image into the one motion vector, calculates the Y-components (components in the flow direction of the exhaust gas) of the averaged motion vectors in the first to eighth images as the movement amounts By1 [m] to By8 [m] of the exhaust gas, calculates an arithmetic mean of the movement amounts By1 [m] to By8 [m] of the exhaust gas in the plurality of images of the one period as the representative movement amount B [m] of the exhaust gas, calculates the actual flow velocity S [m/s] of the exhaust gas from the representative movement amount B [m] of the exhaust gas, calculates the actual flow rate Qm [m³/s] of the exhaust gas from the actual flow velocity S [m/s] of the exhaust gas, and calculates, based on the actual flow rate Qm [m³/s] of the exhaust gas, the mass flow rate M [kg/s] of the exhaust gas.

This makes it possible to accurately measure the mass flow rate M [kg/s] of the exhaust gas even when the flow of the exhaust gas becomes imbalanced, or pulses in the laser introduction duct 20.

Moreover, the processor 90 removes the erroneous vectors from the motion vectors of the exhaust gas at the plurality of positions in each image which are calculated on the basis of two images taken at the time interval of the period T [s], using the motion vectors of the exhaust gas at the plurality of positions in each image which are calculated on the basis of two images taken at the time interval (in the present embodiment, T/5 [s]) shorter than the period T [s].

This makes it possible to accurately calculate the movement amounts By1 [m] to By8 [m], and consequently to accurately measure the mass flow rate M [kg/s] of the exhaust gas.

Moreover, the processor 90 extracts the contours of shading of the exhaust gas in the first to eighth images of the continuous two periods, and calculates, based on the first to eighth images of the continuous two periods in which the contours of shading of the exhaust gas are extracted, the motion vectors of the exhaust gas at the plurality of positions in each image.

This makes it possible to reduce a time required to perform the PIV processing. Therefore, it is possible to adopt DSP or CPU for calculation with relatively low processing-speed as the processor 90, and consequently to reduce a cost for producing the flow rate measuring apparatus 1.

Moreover, even if the first to eighth images have such large size that the conventional PIV processing is not performed thereto, the PIV processing can be performed thereto.

Moreover, the flow rate measuring apparatus 1 further includes the absolute manometers 60 which measures the absolute pressure Pm [kPa (abs)] of the exhaust gas flowing through the laser introduction duct 20, the tube-like bypass 81 whose ends are attached to the laser introduction duct 20, and which communicates with the laser introduction duct 20, and the manometer 82 which measures the pressure of the exhaust gas flowing through the bypass 81. The processor 90 calculates, based on the pressure of the exhaust gas flowing through the bypass 81 measured by the manometer 82, the primary natural frequency fn [Hz] of the air column in the bypass 81, calculates the sonic velocity Cb [m/s] in the bypass 81 from the primary natural frequency fn [Hz] of the air column in the bypass 81, calculates the sonic velocity C [m/s] under the exhaust gas atmosphere from the sonic velocity Cb [m/s] in the bypass 81, calculates, based on the sonic velocity C [m/s] under the exhaust gas atmosphere, the instantaneous temperature Tm [° C.] of the exhaust gas, calculates the standard flow rate Qs [m$^3$/s] of the exhaust gas from the instantaneous temperature Tm [° C.], the absolute pressure Pm [kPa (abs)] and the actual flow rate Qm [m$^3$/s] of the exhaust gas, and calculates, based on the standard flow rate Qs [m$^3$/s] of the exhaust gas, the mass flow rate M [kg/s] of the exhaust gas.

This makes it possible to accurately calculate the instantaneous temperature Tm [C.] of the exhaust gas, and consequently to accurately calculate the mass flow rate M [kg/s] of the exhaust gas.

Moreover, the flow rate measuring apparatus 1 further includes the air-fuel ratio meter 70 which measures the air-fuel ratio Rm of the exhaust gas flowing through the laser introduction duct 20. The processor 90 calculates, based on the air-fuel ratio Rm of the exhaust gas, and the information (H/C and O/C) for properties of the fuel as a source of the exhaust gas, the average molecular mass Mm [kg/mol] of the exhaust gas, calculates the density ρs [kg/m$^3$] of the exhaust gas from the average molecular mass Mm [kg/mol] of the exhaust gas, and calculates, based on the density ρs [kg/m$^3$] of the exhaust gas, the mass flow rate M [kg/s] of the exhaust gas.

This makes it possible to accurately calculate the density ρs [kg/m$^3$] of the exhaust gas, and consequently to accurately calculate the mass flow rate M [kg/s] of the exhaust gas.

Industrial Applicability

The present invention is applied to a flow rate measuring apparatus for measuring a mass flow rate of fluid by PIV processing.

REFERENCE SIGNS LIST

1: flow rate measuring apparatus
10: tracer introduction duct
20: laser introduction duct
30: laser oscillator
40: laser distributor
50: imaging device
60: absolute manometer
70: air-fuel ratio meter
80: temperature measuring device
81: bypass
82: manometer
90: processor

The invention claimed is:
1. The flow rate measuring apparatus measuring a mass flow rate of an exhaust gas from an engine, comprising:
  a duct through which tracers and the exhaust gas flow;
  a laser oscillator which applies a laser;
  a laser distributor which reflects the laser applied by the laser oscillator to turn the laser into a sheet-like laser such as cuts an internal space of the duct along a flow direction of the exhaust gas, and which moves the sheet-like laser in a direction perpendicular to the flow direction of the exhaust gas;
  an imaging device which takes an image of a section of the internal space of the duct cut by the sheet-like laser formed by the laser distributor; and
  a processor which calculates the mass flow rate of the exhaust gas,
  wherein the laser distributor causes the sheet-like laser to make one round trip over a whole area in the duct in the direction perpendicular to the flow direction of the exhaust qas,
  wherein the imaging device defines a time required for the sheet-like laser to make the one round trip in the duct as one period, and takes a plurality of images for the one period at regular time intervals at an exposure time shorter than one of a plurality of equal parts into which the one period is divided while synchronizing a timing of taking the images with one of the plurality of equal parts into which the one period is divided, and
  wherein the processor obtains a plurality of images of continuous two periods from the imaging device,
    calculates, based on the plurality of images of the continuous two periods, motion vectors of the exhaust gas for the one period at a plurality of positions in each of the plurality of images of the one period, averages the motion vectors of the exhaust gas at the plurality of positions in each of the plurality of images of the one period into one motion vector, calculates a component, in the flow direction of the exhaust gas, of the one motion vector in each of the plurality of images of the one period as a movement amount of the exhaust gas, calculates an arithmetic mean of the movement amount of the exhaust gas in the plurality of images of the one period as a representative movement amount of the exhaust gas, calculates an actual flow velocity of the exhaust gas from the representative movement amount of the exhaust gas, calculates an actual flow rate of the exhaust gas from the actual flow velocity of the exhaust gas, and calculates, based on the actual flow rate of the exhaust gas, the mass flow rate of the exhaust gas.

2. The flow rate measuring apparatus according to claim 1, wherein the exposure time at which the imaging device takes each image is a half of one of the plurality of equal parts into which the one period is divided.

3. The flow rate measuring apparatus according to claim 1, wherein the processor removes erroneous vectors from the motion vectors of the exhaust gas at the plurality of positions in each image which are calculated on the basis of two images taken at a time interval of the one period, using the motion vectors of the exhaust gas at the plurality of positions in each image which are calculated on the basis of two images taken at a time interval shorter than the one period.

4. The flow rate measuring apparatus according to claim 1, wherein the processor extracts contours of shading of the exhaust gas in each of the plurality of images of the continuous two periods, and calculates, based on each of the plurality of images of the continuous two periods in which the contours of shading of the exhaust gas are extracted, the motion vectors of the exhaust gas at the plurality of positions in each of the plurality of images of the one period.

5. The flow rate measuring apparatus according to claim 1, further comprising:

an absolute manometer which measures an absolute pressure of the exhaust gas flowing through the duct;

a tube-like bypass which has both ends attached to the duct, and which communicates with the duct; and a manometer which measures a pressure of the exhaust gas flowing through the bypass, wherein the processor calculates, based on the pressure of the exhaust gas flowing through the bypass measured by the manometer, a primary natural frequency of an air column in the bypass, calculates a sonic velocity in the bypass from the primary natural frequency of the air column in the bypass, calculates a sonic velocity under an atmosphere of the exhaust gas from the sonic velocity in the bypass, calculates, based on the sonic velocity under the atmosphere of the exhaust gas, an instantaneous temperature of the exhaust gas, calculates a volumetric flow rate of the exhaust gas in a standard condition from the instantaneous temperature, the absolute pressure and the actual flow rate of the exhaust gas, and calculates, based on the volumetric flow rate of the exhaust gas in the standard condition, the mass flow rate of the exhaust gas.

6. The flow rate measuring apparatus according to claim 1, further comprising:

an air-fuel ratio meter which measures an air-fuel ratio of the exhaust gas flowing through the duct, wherein the processor calculates, based on the air-fuel ratio of the exhaust gas, and properties of fuel as a source of the exhaust gas, an average molecular mass of the exhaust gas, calculates a density of the exhaust gas from the average molecular mass of the exhaust gas, and calculates, based on the density of the exhaust gas, the mass flow rate of the exhaust gas.

\* \* \* \* \*